(12) United States Patent
Madwed et al.

(10) Patent No.: US 11,508,361 B2
(45) Date of Patent: Nov. 22, 2022

(54) SENTIMENT AWARE VOICE USER INTERFACE

(71) Applicant: Amazon Technologies, Inc., Seattle, WA (US)

(72) Inventors: Isaac Joseph Madwed, Seattle, WA (US); Julia Kennedy Nemer, Seattle, WA (US); Joo-Kyung Kim, Kirkland, WA (US); Nikko Strom, Kirkland, WA (US); Steven Mack Saunders, Bellevue, WA (US); Laura Maggia Panfili, Seattle, WA (US); Anna Caitlin Jentoft, Seattle, WA (US); Sungjin Lee, Woodinville, WA (US); David Thomas, Woodinville, WA (US); Young-Bum Kim, Kirkland, MA (US); Pablo Cesar Ganga, Bellevue, WA (US); Chenlei Guo, Redmond, WA (US); Shuting Tang, Seattle, WA (US); Zhenyu Yao, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 192 days.

(21) Appl. No.: 16/889,420

(22) Filed: Jun. 1, 2020

(65) Prior Publication Data

US 2021/0375272 A1   Dec. 2, 2021

(51) Int. Cl.
*G10L 15/18*   (2013.01)
*G10L 15/22*   (2006.01)
*G10L 15/26*   (2006.01)

(52) U.S. Cl.
CPC .......... *G10L 15/1815* (2013.01); *G10L 15/22* (2013.01); *G10L 15/26* (2013.01); *G10L 2015/225* (2013.01); *G10L 2015/227* (2013.01)

(58) Field of Classification Search
CPC ..... G10L 15/00; G10L 15/1815; G10L 15/22; G10L 15/26; G10L 2015/225; G10L 2015/227
See application file for complete search history.

(56) References Cited

U.S. PATENT DOCUMENTS 6,581,033 B1    6/2003  Reynar et al.
9,633,674 B2 *  4/2017  Sinha ...................... G10L 25/00
(Continued)

OTHER PUBLICATIONS

Y. He, J. Tang, H. Ouyang, C. Kang, D. Yin, and Y. Chang, "Learning to rewrite queries," in Proceedings of the 25th ACM International on Conference on Information and Knowledge Management, pp. 1443-1452, 2016.
(Continued)

*Primary Examiner* — Daniel C Washburn
*Assistant Examiner* — Sean E Serraguard
(74) *Attorney, Agent, or Firm* — Pierce Atwood LLP

(57) ABSTRACT

Described herein is a system for responding to a frustrated user with a response determined based on spoken language understanding (SLU) processing of a user input. The system detects user frustration and responds to a repeated user input by confirming an action to be performed or presenting an alternative action, instead of performing the action responsive to the user input. The system also detects poor audio quality of the captured user input, and responds by requesting the user to repeat the user input. The system processes sentiment data and signal quality data to respond to user inputs.

18 Claims, 14 Drawing Sheets

(56) References Cited

U.S. PATENT DOCUMENTS

| | | | | |
|---|---|---|---|---|
| 11,348,601 | B1* | 5/2022 | Deshpande | G06F 40/35 |
| 2011/0246189 | A1* | 10/2011 | Fox | G10L 25/78 |
| | | | | 704/226 |
| 2014/0365226 | A1* | 12/2014 | Sinha | G10L 15/22 |
| | | | | 704/275 |
| 2016/0019915 | A1* | 1/2016 | Khan | G10L 19/018 |
| | | | | 704/239 |
| 2017/0160813 | A1* | 6/2017 | Divakaran | G10L 25/63 |
| 2017/0270929 | A1* | 9/2017 | Aleksic | G10L 15/22 |
| 2018/0254035 | A1* | 9/2018 | Kulkarni | G10L 15/22 |
| 2019/0355351 | A1 | 11/2019 | Kim et al. | |

OTHER PUBLICATIONS

S. Riezler, Y. Liu, "Query rewriting using monolingual statistical machine translation," Computational Linguistics, vol. 36, No. 3, pp. 569-582, 2010.

J. Wang, J. Z. Huang, D. Wu, "Recommending High Utility Queries via Query-Reformulation Graph", Mathematical Problems in Engineering, vol. 2015, Article ID 956468, 14 pages, 2015.

International Search Report and Written Opinion issued in International Patent Application No. PCT/US2021/031720, dated Aug. 30, 2021, 12 pages.

F. Hao, "Building a User-Centric and Content-Driven Socialbot," May 6, 2020, 150 pages, arXiv preprint arXiv:2005.02623.

\* cited by examiner

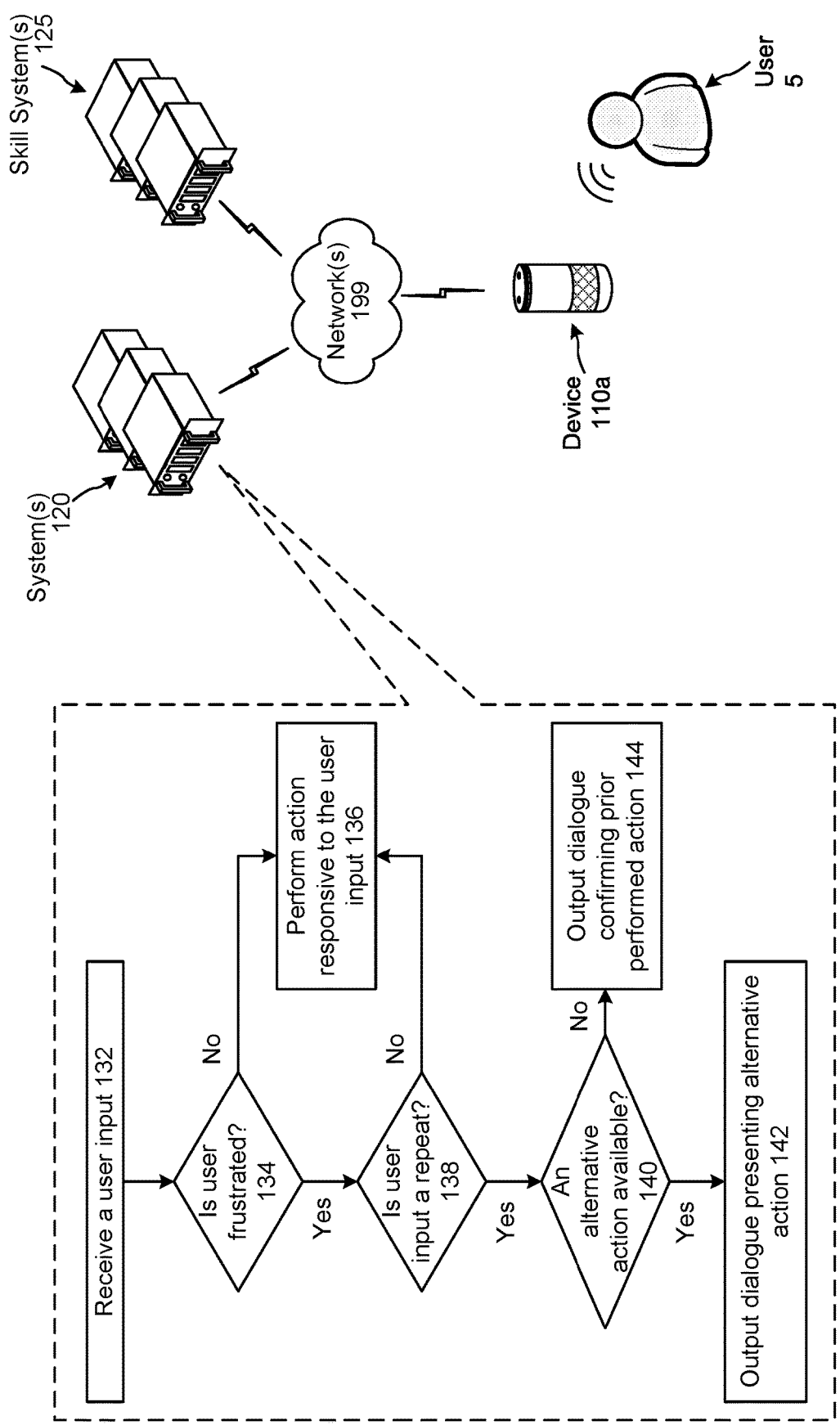

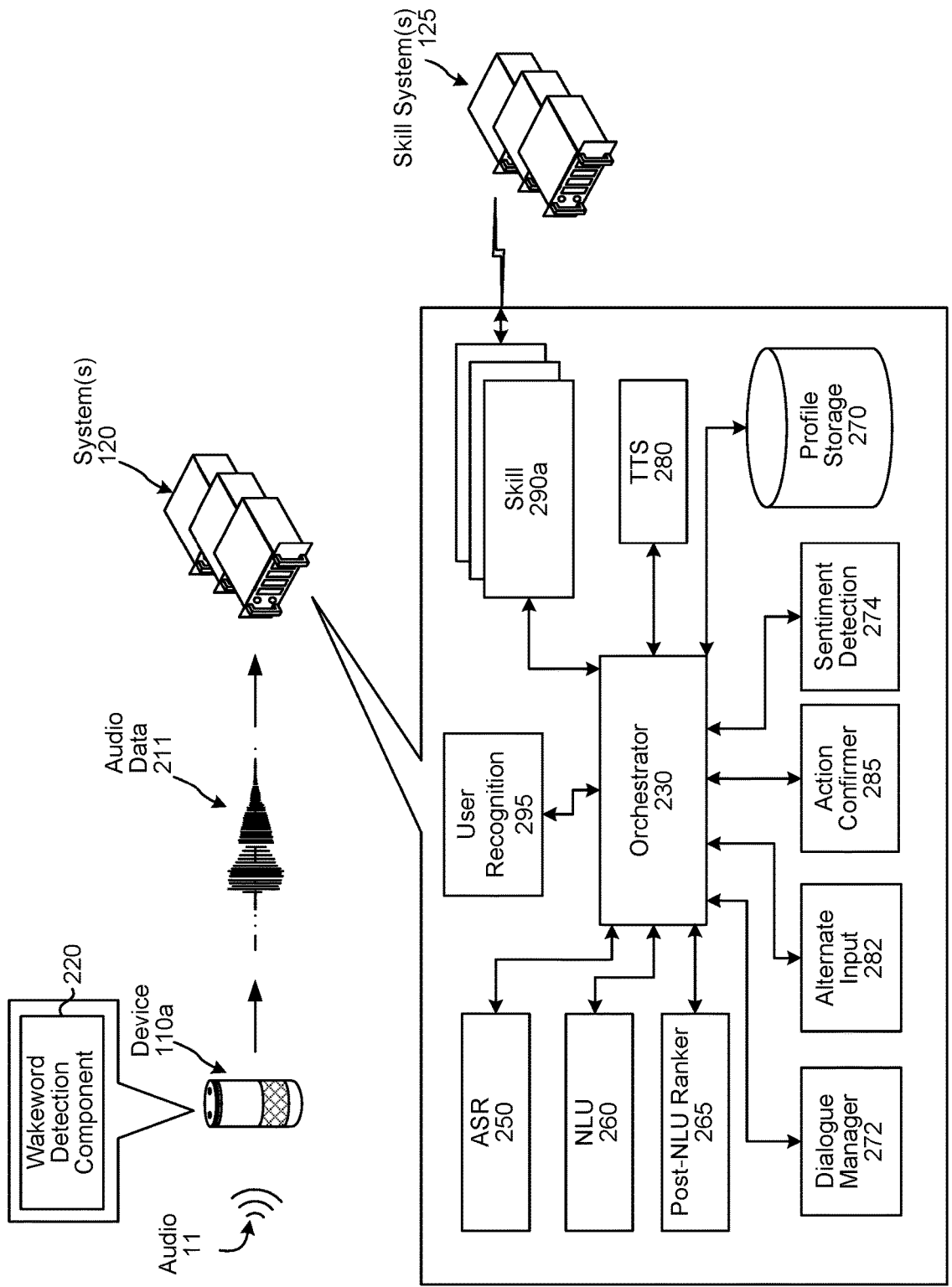

SENTIMENT AWARE VOICE USER INTERFACE

BACKGROUND

Spoken language systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and/or natural language understanding processing techniques, or other techniques or combination thereof used to interpret input audio data is referred to herein as spoken language understanding. Spoken language understanding may also involve converting a user's speech into text data that may then be provided to various text-based software applications.

Spoken language understanding may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1A illustrates a system configured to output a dialogue in response to a repeat user input and a frustrated user according to embodiments of the present disclosure.

FIG. 2A is a conceptual diagram of components of a system according to embodiments of the present disclosure.

DETAILED DESCRIPTION

Figure 1B:
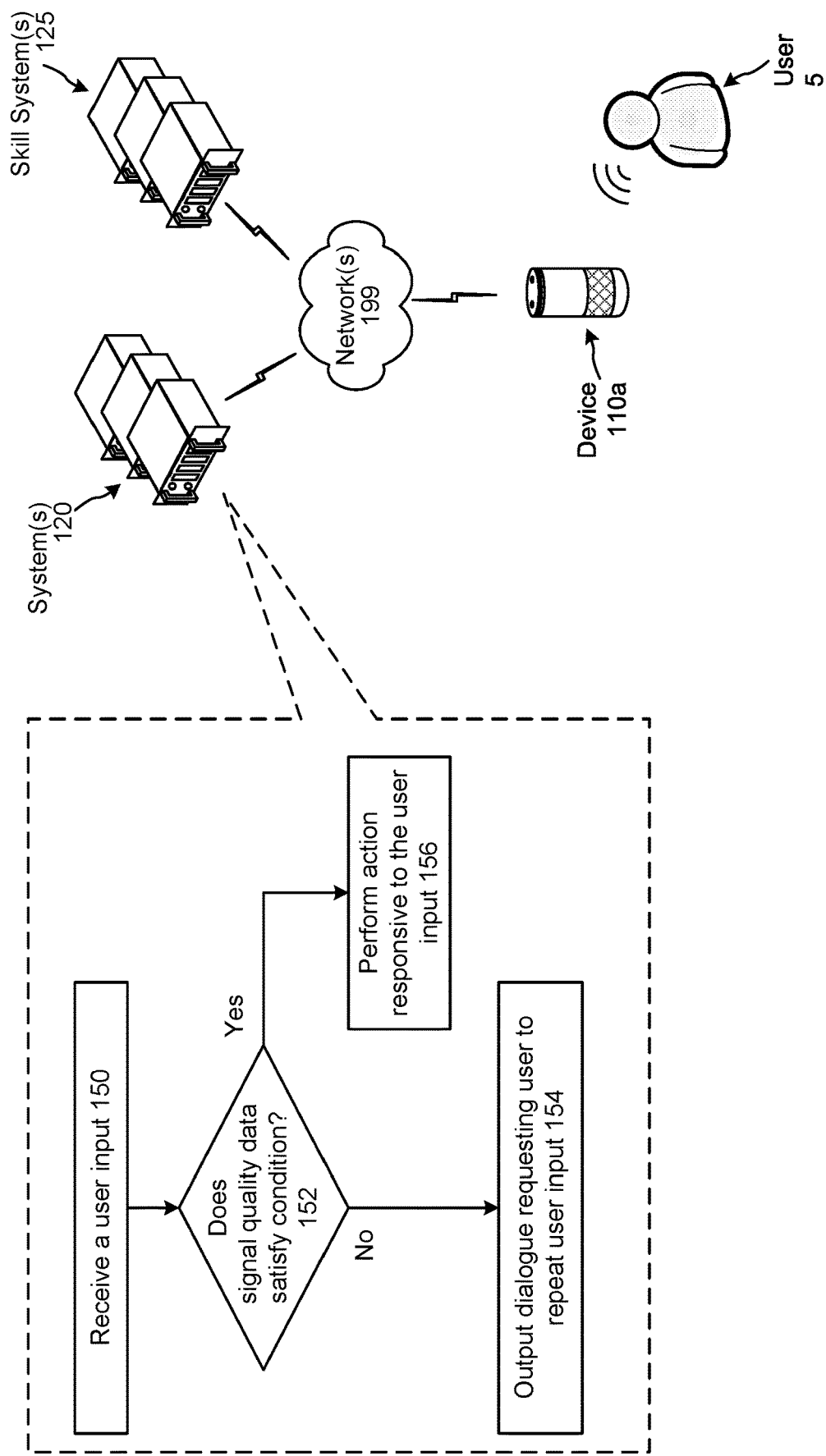
FIG. 1B illustrates a system configured to respond to a user input based on signal quality data according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a spoken language understanding (SLU) system. Text-to-speech (TTS) is a field of concerning transforming textual data into audio data that is synthesized to resemble human speech.

Certain systems may be configured to perform actions responsive to user inputs. For example, for the user input of "Alexa, play Adele music," a system may output music sung by an artist named Adele. For further example, for the user input of "Alexa, what is the weather," a system may output synthesized speech representing weather information for a geographic location of the user. In a further example, for the user input of "Alexa, send a message to John," a system may capture spoken message content and cause same to be output via a device registered to "John."

A SLU system may receive a user input as speech. For example, a user may speak an input to a device. The device may send audio data, representing the spoken input, to the system. The system may perform ASR processing on the audio data to generate text data representing the user input. The system may perform NLU processing on the text data to determine an intent of the user input as well as portions of the text data that may be used to perform an action responsive to the user input.

One potential failure point for a SLU system may occur when errors in ASR processing causes the system to not understand what the user said and when errors in NLU processing causes the system to not understand the user's intention. For example, a spoken input of "open YouTube" may be misrecognized during ASR processing as "open U2," and subsequent NLU processing may be unable to correctly interpret the utterance and, more generally, the system unable to perform the user's desired action causing friction in the user experience.

When the system provides an output that is not what the user wanted in response to the user input (e.g., "I am unable to process your request", the system generates the wrong output, etc.), it causes friction in the user experience. There are various ways friction can be caused during a user's interaction with a natural language processing system. For example, there could be errors relating to ASR, NLU, and/or entity recognition that accumulate through the processing pipeline, or there could be user errors such as a slip of tongue. There could also be errors caused by the user's environment, such as, the captured audio includes background noise, the user is too far from the microphone or the user is speaking softly. In this case, the user's speech may not be represented clearly in the captured audio.

When the system does not provide the expected/desired response, the user may repeat the request in hopes to cause the system to perform the desired action. The system may respond to the repeated user input by repeating the prior action because processing the repeated user input results in the same or similar ASR/NLU data as the processing of the previous user input. In some embodiments, the system responds to a repeated user input with a dialogue (e.g., clarifying question), instead of or before repeating the prior action, where the dialogue either confirms performance of the prior action or offers an alternative action. The system can determine that a user repeated the user request from a prior turn in the dialogue session. The system can also determine that the user exhibited frustration while repeating the user input. Based on these determinations, instead of performing an action responsive to the user input, the system may be configured to use natural language generation and/or other component(s) to output a confirmation dialogue or other type of disambiguation dialogue.

The system of the present disclosure can be configured to determine that the user is likely frustrated, e.g., due to friction caused by the system's response to the prior user input, and instead of responding in the usual manner (which may result in furthering the user's frustration), the system can be configured to generate natural language response representing a question that asks the user to confirm the action to be performed in response to the user request before it is performed. For example, where the system (1) detects a repeat utterance after the system provide an initial response and/or some frustration in the user's voice, and (2) has high confidence values associated with its machine interpretation of what the user said (the ASR processing was performed with a certain confidence level in the subsequent and/or frustrated-sounding utterance) and the system is also relatively confident about the user's intentions (the NLU processing was performed with a certain confidence level with respect to the subsequent and/or frustrated-sounding utterance), the system can output a confirmation dialogue in response to the user input. In the confirmation dialogue, the system asks the user to confirm that the user wants the interpreted action to be performed. For example, a user may say "play Harry Potter," and the system may respond by playing a movie titled Harry Potter and the Sorcerer's Stone. In response, the user may repeat the request: "play Harry Potter!" with some frustration. The system may process the user request, realize that it is a repeat of the initial request and that the user is frustrated, and instead of responding by playing the movie again, the system outputs the following dialogue: "I am sorry, I may have misunderstood you. Do you want me to play the movie Harry Potter and the Sorcerer's Stone?" If the user responds yes, then the system may continue playing the movie or restart the movie. If the user responds no, then the system may ask the user to rephrase the request or otherwise provide additional information to help the system to perform the desired action.

In another case, where the system may have determined at least two options for what the user said (the ASR processing resulted in two hypotheses with a certain confidence level or an alternative user request was determined) or the system may have determined at least two options for the user's intentions (the NLU processing resulted in two hypotheses with a certain confidence level), the system can be configured to output a disambiguation dialogue in response to a user input repeated with some frustration. For example, a user may say "what is the weather in Boston," the system may have determined that the user either said "Boston" or "Austin", and decides to respond by outputting the weather for Boston since the confidence level associated with "Boston" was higher than "Austin". In response, the user may repeat the request: "no, what is the weather in Boston!" with some frustration. The system may process the user request, realize that it is largely a repeat of the initial request albeit sounding more like the user is frustrated, and instead of responding with Boston's weather again, the system outputs the following dialogue: "I may have misunderstood you. Did you want the weather for Boston or Austin?"

The system of the present disclosure may also respond to a user input with a request to repeat the input when the system detects that the captured audio does not include a good quality representation of the user's speech. For example, the system may respond with "Can you repeat that? I did not understand what you said", "Can you please speak loudly?", "Can you move closer to the microphone, so I can hear you better?", etc.

The system of the present disclosure may also detect the user's negative sentiments based on the content of the user input, and may respond accordingly. For example, a user may say "Alexa, start a timer for fifteen minutes," and the system may respond "Did you say fifteen or fifty?" In response the user may say "shut up Alexa," and the system may respond "I am sorry" and end the dialogue session, rather than continuing the dialogue by disambiguating or pre-confirming an action or requesting additional information.

The system of the present disclosure may provide a more desirable user experience by reducing user frustration. This is due, at least in part, to the fact that the present disclosure's teachings reduces repeated actions that frustrates the user. The system also proactively requests the user to repeat the input when the initial input is of poor quality. By decreasing the instances of actions that frustrate the user, the user/system interactions may be improved.

Figure 1C:
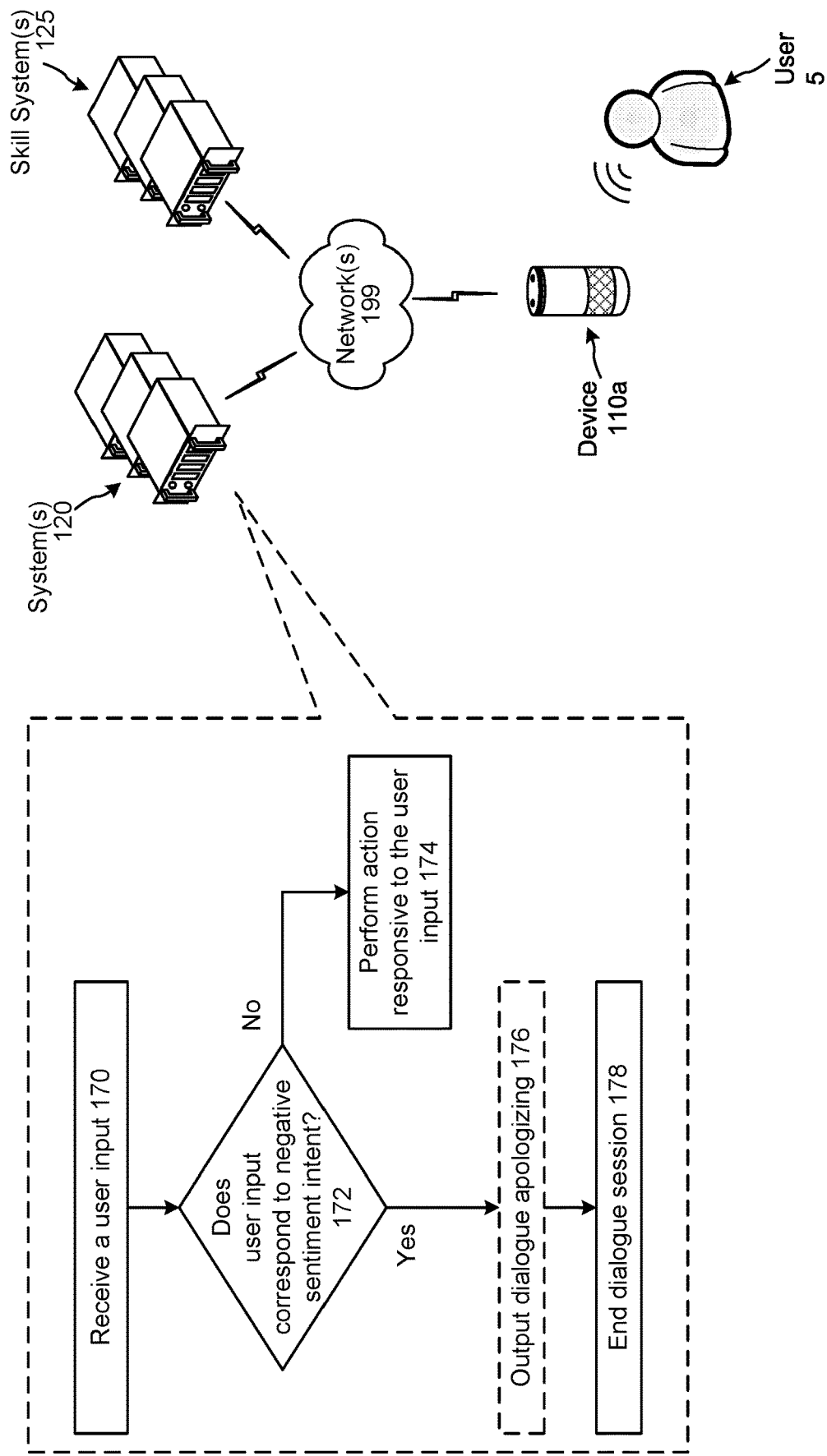
FIG. 1C illustrates a system configured to respond to a user input corresponding to a negative sentiment intent according to embodiments of the present disclosure.

FIG. 1A illustrates a system configured to output a dialogue in response to a repeat user input and a frustrated user according to embodiments of the present disclosure. FIG. 1B illustrates a system configured to respond to a user input based on signal quality data according to embodiments of the present disclosure. FIG. 1C illustrates a system configured to respond to a user input corresponding to a negative sentiment intent according to embodiments of the present disclosure. As illustrated in FIGS. 1A, 1B and 1C, the system may include a device 110a local to a user 5, one or more systems 120, and one or more skill systems 125 connected across one or more networks 199. The system(s) 120 may be a SLU system configured to perform spoken language understanding (SLU) processing.

As used herein, the system(s) 120 performing disambiguation (or the system(s) 120 disambiguating, disambiguates, etc.) refers to the system(s) 120 presenting an output including two or more options for the user to choose from, that the system is to proceed with/perform further processing to generate an output/perform an action responsive to the user input. The system(s) 120 may respond to a user input with a disambiguation dialogue instead of responding by performing an action. Example disambiguation dialogues may include system responses such as "Did you mean Boston or Austin?", "Do you want the book or the movie?", "Should I start a timer for fifteen minutes or fifty minutes?", etc. Such disambiguation dialogue can help reduce friction in a user experience that may be caused by the system performing an action that the user did not expect in response to the user input.

As used herein, the system(s) 120 performing confirmation (or the system(s) 120 confirming, confirms, etc.) refers to the system(s) 120 presenting an output to confirm the action the system(s) 120 is to take in response to the user input. The system(s) 120 may respond to a user input with a confirmation dialogue instead of responding by performing the action. Example confirmation dialogues may include system responses such as "Do you want the weather for Boston?", "Should I play the movie XYZ?", "Did you say fifteen?", etc. Such confirmation dialogue can help reduce friction in a user experience that may be caused by the system performing an action that the user did not expect in response to the user input.

Although interactions with the user are referred to as dialogues (e.g., disambiguation dialogue, confirmation dialogue, repeat dialogue, etc.), it should be understood that the a dialogue exchange between the user and the system(s) 120 may involve voice inputs, text inputs, inputs in the form of gestures, GUI inputs, synthesized speech outputs, displayed text/image/video outputs, displayed graphical outputs, message/email outputs, notifications, and other forms of inputs and outputs.

Referring to FIG. 1A, the system(s) 120 receives (132) a user input from the user 5 via the device 110*a*. The user input may be audio data representing an utterance spoken by the user 5. In other cases, the user input may be another type of data, for example, text data, representing a natural language input from the user 5. In the case that the user input is audio data, the system(s) 120 may perform ASR processing, as described below, to determine one or more ASR hypotheses including text data representing the user input. The system(s) 120 may then perform NLU processing using the text data, as described below, to determine one or more NLU hypotheses representing the user's intent. Such processing of the user input may be referred to as SLU processing, and the data (e.g., ASR hypotheses, NLU hypotheses, etc.) may be referred to as SLU processing data.

In one example, the user input may be part of a multi-turn dialogue exchange/session between the user 5 and the system(s) 120. The system(s) 120 may associate a dialogue session identifier with the user inputs and the system-generated responses for the instant dialogue session. The system(s) 120 may also associate the dialogue session identifier with the SLU processing data determined during processing of the current user input and during processing of user inputs of previous turns of the dialogue session.

The system(s) 120 determines (136) if the user is frustrated using, for example, sentiment data corresponding to the user input. The sentiment data may be determined by the system(s) 120 based on acoustic characteristics of the audio data representing the user input, where processing/evaluation of the acoustic characteristics indicates that the user is frustrated, agitated, angry, disappointed, disgust, or is exhibiting other similar sentiments. For example, the user may speak the user input with a certain level of frustration indicated by the acoustic characteristics of the audio data. The sentiment data may be determined by the system(s) 120 based on the content of the user input, where processing/evaluation of text data representing the user input may indicate that the user is frustrated. For example, the user may sigh, may say "ugh" or may say other words indicating frustration, disgust, disappointment, or other similar sentiments. The sentiment data may be determined by the system(s) 120 based on image data captured by a camera of the device 110*a*, where processing/evaluation of the image data may indicate that the user's facial expression, gestures or other actions correspond to frustration. For example, while speaking the user input the user may shake his/her head indicating disappointment or frustration. The system(s) 120 may also determine that the user is frustrated based on the user interrupting the system(s) 120 while performing an action.

If the system(s) 120 determines that the user is not frustrated, then the system(s) 120 performs (136) an action responsive to the user input. The action to be performed may be based on the SLU processing of the user input. The system(s) 120 may route the user input and data related to the SLU processing of the user input to a skill system 125 that may be capable of responding to the user input. As used herein, the system performing an action responsive to a user input may include the system presenting an output responsive to the user input (e.g., presenting the weather requested by the user by displaying weather information and/or outputting synthesized speech), operating one or more devices (e.g., causing a device to play music/a movie, turning on lights, etc.), storing data (e.g., storing notification/reminder data to output to the user when an event occurs), sending data to another system (e.g., sending the user input and other related data to a food delivery system), and other actions that may be responsive to the user input.

If the system(s) 120 determines that the user is frustrated, then the system(s) 120 performs step 138, where the system(s) 120 determines (138) whether the user input is a repeat of a prior user input of the dialogue session. The system(s) 120 may use dialogue history data to determine whether the user is repeating a prior user input. The user input may be a repeat of a prior user input based on a comparison of the ASR data corresponding to the two user inputs, a comparison of the NLU data corresponding to the two user inputs and/or a comparison of other data corresponding to the two user inputs. The prior user input may be provided by the user in the immediate prior turn to the current turn or may be provided within a certain number of prior turns of the dialogue session. The system(s) 120 may determine a repeat indicator based on the user input being semantically similar to a previous user input. The repeat indicator may be a yes or no value, 0 or 1 value, true or false, or other values indicating whether or not the user input is a repeat.

If the user input is not a repeat of a prior user input, then the system(s) 120 performs (136) an action responsive to the user input, as described above. If the user input is a repeat of a prior user input, then the system(s) 120 performs step 140, where the system(s) 120 determines (140) if an alternative action is available. An alternative action may be an action other than the one performed by the system(s) 120 in response to the prior user input of which the current user input is repeat of. The system(s) 120 may determine that an alternative action is available based on ASR data (e.g., ASR confidence scores), NLU data (e.g., NLU confidence scores), alternate representation(s) of the user input, and other data. Details on how the system determines whether an alternative action is available are described below in relation to FIG. 7.

If an alternative action is available in response to the user input, then the system(s) 120 outputs (142) a dialogue presenting the alternative action. The system(s) 120 may output a disambiguation dialogue presenting the alternative action to the user to confirm whether the system should proceed with the alternative action. The system(s) 120 may output a disambiguation dialogue presenting the alternative action and the previously performed action asking the user to choose which action the system should proceed with. If an alternative action is not available, then the system(s) 120 outputs (144) a dialogue confirming the prior performed action (the action that was performed in response to the prior user input that the current user input is a repeat of). Instead of repeating the action, the system(s) 120 may output a confirmation dialogue to confirm that the user wants the system to perform the particular action.

When an alternative action is not available, the system(s) 120 may output a dialogue requesting the user to rephrase the user input. Alternatively, if the user responds to the confirmation dialogue in the negative (e.g., "No I don't want you to <repeated action>"), then the system(s) 120 may output a dialogue requesting the user to rephrase the user input.

In some embodiments, the system(s) 120 may determine that an ambiguity exists prior to performing the operations of steps 134 and/or 138. In some embodiments, the system(s) 120 may determine an ambiguity exists in the SLU processing of the user input based on, for example, the ASR data and the NLU data. For example, a first score corresponding to the top ASR hypothesis (1-best) in the N-best list may not exceed a threshold, indicating that the system may have low confidence in what the audio data represents with respect to a user's speech. In another example, the first score and a second score corresponding to another ASR hypothesis (e.g., 2-best) in the N-best list may be within a threshold range of each other, indicating that there is a high likelihood that the audio data may correspond to either of the hypotheses. Such ambiguity may be caused when the utterance includes a word that may sound similar to one or more other words, or may be caused by the way the user speaks (e.g., accents, pronunciations, intonations, etc.). The system(s) 120 may associate the dialogue session ID with the ASR N-best list corresponding to the user input.

In another example, a first score corresponding to the top NLU hypothesis (1-best) in the N-best list may not exceed a threshold, indicating that the system may have low confidence in determining the user's intent or the action the user wants performed. In another example, the first score and a second score corresponding to another NLU hypothesis (e.g., 2-best) in the N-best list may be within a threshold range of each other, indicating that there is a high likelihood that the user's intent may correspond to either of the hypotheses. Such ambiguity may be caused when the user input is vague and does not include enough information for the system(s) 120 to determine an action responsive to the user input. The system(s) 120 may associate the dialogue session ID with the NLU N-best list corresponding to the user input.

In another example, an alternate input component (e.g., 282 described below) may determine an alternative representation of the user input based past rephrases corresponding to the user input. The alternate input component may determine that the user input is likely to cause friction (e.g., result in an error or undesired response) based on past interactions with different users. The alternate input component may determine a rephrase of the user input that is known to result in a successful outcome (e.g., desired response). Based on the alternate input component determining an alternative representation of the user input, the system(s) 120 may determine that an ambiguity exists with respect to the SLU processing of the user input.

In some embodiments, the system(s) 120 may output a confirmation dialogue (confirming an action prior to performing it) or a disambiguation dialogue (presenting an alternative action/presenting options for actions the system can perform) when the system(s) 120 determines that the user is frustrated, without determining whether the user input is a repeat of a prior user input. For example, the system(s) 120 may perform step 134 and determine that the user is frustrated, and may then perform step 140 and output a dialogue (per step 142 or 144) instead of performing an action responsive to the user input.

Referring to FIG. 1B, the system(s) 120 receives (150) a user input, in a similar manner as described with respect to step 132 above. The system(s) 120 determines (152) whether signal quality data corresponding to the audio data representing the user input satisfies a condition. The signal quality data may include values representing one or more of a signal-to-noise ratio (SNR), a signal-to-interference ratio (SIR), a signal-to-interference-plus-noise ratio (SINR), a signal-to-echo ratio (SER), a peak signal-to-noise ratio (PSNR; the ratio between the maximum possible value (power) of a signal and the power of distorting noise that affects the quality of its representation), and other values corresponding to the signal quality/characteristics of the audio data. The signal quality data may be determined by processing the above mentioned values using statistical analysis, using one or more machine learning models, using one or more algorithms, and other types of operations.

If the signal quality data satisfies one or more conditions, then the system(s) 120 performs (156) an action responsive to the user input, in a similar manner as described in relation to step 136 above. If the signal quality data does not satisfy one or more conditions, then the system(s) 120 outputs (154) a dialogue representing a system request, such as requesting the user to repeat the user input, requesting the user to move closer to the device, and/or requesting the user to speak louder. The condition(s) at step 152 that the system(s) 120 may check may relate to determining whether the audio data captures the user's speech with enough clarity that the SLU processing, in particular ASR, can be performed with a certain level of confidence, or that the SLU processing results can be used to respond to the user input with a certain level of confidence. In one example, the system(s) 120 may check if the SNR corresponding to the audio data exceeds a threshold value indicating that the audio data captured a lot of background noise compared to the user speech, which may cause ASR processing errors. In another example, the system(s) 120 may check if energy values corresponding to the user speech is below a threshold value indicating that the user is speaking softly or is far from the microphone, which may cause also cause ASR processing errors.

The system(s) 120 may output an appropriate system request dialogue based on the signal quality characteristic checked. For example, if background noise is detected, the system(s) 120 may output a dialogue requesting the user to repeat the user input and speak louder. In another example, if the user is speaking softly or is far from the microphone, then the system(s) 120 may output a dialogue requesting the user to move closer to the microphone and repeat the user input.

Referring to FIG. 1C, the system(s) 120 receives (170) a user input, in a similar manner as described above in relation to step 132. The system(s) 120 determines (172) that the user input corresponds to a negative sentiment intent. For example, a negative sentiment intent may be the user providing/expressing a negative sentiment towards the system. The negative sentiment intent may be determined based on certain words included in the user input, based on the user input describing the user's sentiments for the system, etc. For example, the following user inputs may correspond to the negative sentiment intent: "shut up Alexa", "you are stupid", "I don't like you", etc.

If the user input does not correspond to a negative sentiment intent, then the system(s) 120 performs (174) an action responsive to the user input as described in relation to step 136 above. If the user input corresponds to a negative sentiment intent, then the system(s) 120 may output (176) an acknowledgement of the negative sentiment. For example, the acknowledgement may be an apologizing dialogue, such as, "I am sorry" or "sorry about that." In another example, the acknowledgment may be "ok". The system(s) 120 may determine, using natural language generation, output data (e.g., text data) representing the acknowledgement. The system(s) 120 also ends (178) the dialogue session. By ending the current dialogue session, the system(s) 120 associates any subsequent user inputs to another dialogue session identifier. The user input may be part of a multi-turn dialogue session, where the user input received at step 170 may be for a second turn of the dialogue session and may be in response to the system-generated response to the prior user input of the dialogue session. The system(s) 120 may realize that the user is upset/dissatisfied with the system response and may end the dialogue session accordingly. The system may continue to engage the user to determine how the system response is wrong or what the user means/wants. The system of the present disclosure, instead, ends the dialogue session to reduce user frustration/disappointment.

As used herein, a "dialogue," "dialogue session," "dialogue session data" or the like refers to various related user inputs and system outputs, for example inputs and outputs related to an ongoing exchange between a user and the system, and includes ASR and/or NLU data corresponding to the user inputs.

The overall system of the present disclosure may operate using various components as illustrated in FIG. 2A. The various components may be located on same or different physical devices. Communication between various components may occur directly or across a network(s) 199.

An audio capture component(s), such as a microphone or array of microphones of the device 110a, captures audio 11. The device 110a processes audio data, representing the audio 11, to determine whether speech is detected. The device 110a may use various techniques to determine whether audio data includes speech. In some examples, the device 110a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110a may implement a limited classifier configured to distinguish speech from background noise. The classifier may be implemented by techniques such as linear classifiers, support vector machines, and decision trees. In still other examples, the device 110a may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110a may use a wakeword detection component 220 to perform wakeword detection to determine when a user intends to speak an input to the device 110. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

In various embodiments, the device 110 may behave differently depending on which wakeword is used. For example, in a multi-user environment, different users may use different wakewords, and the device 110 may tailor its operation in response to a particular user/wakeword matching. The device 110 may, for example, access a user profile associated with a particular wakeword and load device preferences or device usage history stored in the user profile. In other embodiments, a first wakeword may be associated with a first mode of operation of the device 110 and a second wakeword may be associated with a second mode of operation of the device 110. The first mode of operation may be, for example, a personal assistant, and the second mode of operation may be navigation (such as automobile navigation).

In another example the device 110 may be configured to process commands associated with a first wakeword using a different set of components than commands associated with a second wakeword. For example, if an utterance includes the wakeword "Alexa," audio data for that wakeword may be sent to a first speech processing system for speech processing and/or command execution. If an utterance includes the wakeword "Ok Google," audio data for that wakeword may be sent to a second speech processing system for speech processing and/or command execution. In another example the system may also use different wakewords for different skills within a same speech processing system. For example, a user may speak "Ford" as a special wakeword to invoke a specific skill or processing pipeline within a first speech processing system (e.g., a speech processing system that may otherwise be invoked by speaking "Alexa"). Use of the special "Ford" wakeword may result in different routing of the utterance through the first speech processing system than use of a standard wakeword such as "Alexa." Thus the device 110 using the techniques described herein may process incoming audio to determine a first confidence that a detected wakeword is a first wakeword associated with a first speech processing pipeline (which may be a first speech processing system or a first pipeline (e.g., skill, etc.) within the first speech processing system) as well as determine a second confidence that the detected wakeword is a second wakeword associated with a second speech processing pipeline (which may be a second speech processing system or a second, different, pipeline (e.g., skill, etc.) within the second speech processing system. The different systems/pipelines may be associated with different ASR processing, different NLU processing, different commands/intents, or other differences.

Once the wakeword is detected, the device 110a may "wake" and begin transmitting audio data 211, representing the audio 11, to the system(s) 120. The audio data 211 may include data corresponding to the wakeword, or the device 110a may remove the portion of the audio corresponding to the wakeword prior to sending the audio data 211 to the system(s) 120.

An orchestrator component 230 may receive the audio data 211. The orchestrator component 230 may include memory and logic that enables the orchestrator component 230 to transmit various pieces and forms of data to various components of the system, as well as perform other operations.

The orchestrator component 230 sends the audio data 211 to an ASR component 250. The ASR component 250 transcribes the audio data 211 into text data. The text data output by the ASR component 250 represents one or more than one (e.g., in the form of an n-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The text data output by the ASR component 250 may include a top scoring ASR hypothesis or may include an n-best list of ASR hypotheses. Each ASR hypothesis may be associated with a respective score. Each score may indicate a confidence of ASR processing performed to generate the ASR hypothesis with which the score is associated.

The orchestrator component 230 may send text data (e.g., text data output by the ASR component 250) to an NLU component 260.

The NLU component 260 attempts to make a semantic interpretation of the phrase(s) or statement(s) represented in the received text data. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the system(s) 120, a skill 290, a skill system(s) 125, etc.) to execute the intent. For example, if the text data corresponds to "play Adele music," the NLU component 260 may determine an intent that the system(s) 120 output music and may identify "Adele" as an artist. For further example, if the text data corresponds to "what is the weather," the NLU component 260 may determine an intent that the system(s) 120 output weather information associated with a geographic location of the device 110. In another example, if the text data corresponds to "turn off the lights," the NLU component 260 may determine an intent that the system(s) 120 turn off lights associated with the device(s) 110 or the user(s) 5. The NLU component 260 may send NLU results data (which may include tagged text data, indicators of intent, etc.).

The system(s) 120 may include one or more skills 290. A "skill" may be software running on the system(s) 120 that is akin to a software application running on a computing device. That is, a skill 290 may enable the system(s) 120 to execute specific functionality in order to provide data or produce some other requested output. The system(s) 120 may be configured with more than one skill 290. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the system(s) 120, a skill 290 may be implemented by a skill system(s) 125. Such may enable a skill system(s) 125 to execute specific functionality in order to provide data or perform some other action requested by a user.

Skills may be associated with different domains, such as smart home, music, video, flash briefing, shopping, and custom (e.g., skills not associated with any pre-configured domain).

The system(s) 120 may be configured with a single skill 290 dedicated to interacting with more than one skill system 125.

Unless expressly stated otherwise, reference to a skill, skill device, skill component, or the like herein may include a skill 290 operated by the system(s) 120 and/or skill operated by the skill system(s) 125. Moreover, the functionality described herein as a skill may be referred to using many different terms, such as an action, bot, app, or the like.

The system(s) 120 may include a post-NLU ranker 265 that receives NLU results data and determines (as described in detail herein) which skill the system(s) 120 should invoke to execute with respect to the user input. The post-NLU ranker 265 may be implemented separately from the orchestrator component 230 (as illustrated) or one or more components of the post-NLU ranker 265 may be implemented as part of the orchestrator component 230.

The system(s) 120 may include a TTS component 280. The TTS component 280 may generate audio data (e.g., synthesized speech) from text data using one or more different methods. Text data input to the TTS component 280 may come from a skill 290, the orchestrator component 230, or another component of the system(s) 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system(s) 120 may include profile storage 270. The profile storage 270 may include a variety of information related to individual users, groups of users, devices, etc. that interact with the system(s) 120. A "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user. Each user profile may include identifiers of skills that the user has enabled. When a user enables a skill, the user is providing the system(s) 120 with permission to allow the skill to execute with respect to the user's inputs. If a user does not enable a skill, the system(s) 120 may not permit the skill to execute with respect to the user's inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The system(s) 120 may include a user recognition component 295. In at least some examples, the user recognition component 295 may be implemented as a skill system(s) 125.

The user recognition component 295 may recognize one or more users using various data. The user recognition component 295 may take as input the audio data 211 or other forms of input provided by the user 5. The user recognition component 295 may perform user recognition by comparing speech characteristics, in the audio data 211, to stored speech characteristics of users. The user recognition component 295 may additionally or alternatively perform user recognition by comparing biometric data (e.g., fingerprint data, iris data, etc.), received by the system(s) 120 in correlation with a natural language input, to stored biometric data of users. The user recognition component 295 may additionally or alternatively perform user recognition by comparing image data (e.g., including a representation of at least a feature of a user), received by the system(s) 120 in correlation with a natural language input, with stored image data including representations of features of different users. The user recognition component 295 may perform other or additional user recognition processes, including those known in the art. For a particular natural language input, the user recognition component 295 may perform processing with respect to stored data of users associated with the device 110 that captured the natural language input.

The user recognition component 295 determines whether a natural language input originated from a particular user. For example, the user recognition component 295 may generate a first value representing a likelihood that a natural language input originated from a first user, a second value representing a likelihood that the natural language input originated from a second user, etc. The user recognition component 295 may also determine an overall confidence regarding the accuracy of user recognition operations.

The user recognition component 295 may output a single user identifier corresponding to the most likely user that originated the natural language input. Alternatively, the user recognition component 295 may output multiple user identifiers (e.g., in the form of an N-best list) with respective values representing likelihoods of respective users originating the natural language input. The output of the user recognition component 295 may be used to inform NLU processing, processing performed by a skill system(s) 125, as well as processing performed by other components of the system(s) 120 and/or other systems.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 2B:
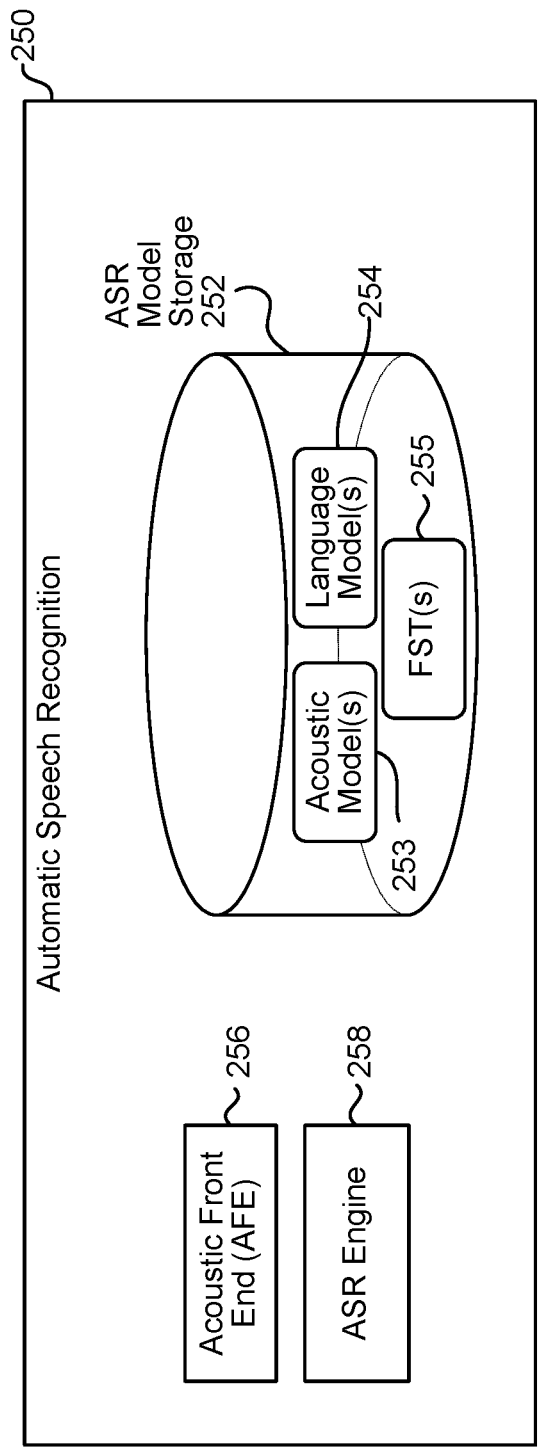
FIG. 2B is a conceptual diagram of automatic speech recognition components of the system according to embodiments of the present disclosure.

FIG. 2B as illustrated shows specific components of the ASR component 250. As noted above, the ASR component 250 transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 254 stored in an ASR model storage 252. For example, the ASR process may compare the input audio data with models for sounds (e.g., subword units or phonemes) and sequences of sounds to identify words that match the sequence of sounds spoken in the utterance of the audio data. Alternatively, the ASR process may use a finite state transducer (FST) 255 to implement the language model functions, as explained below.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR model storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 256 and an ASR engine 258. The acoustic front end (AFE) 256 transforms the audio data from the microphone into data for processing by the n. The ASR engine 258 compares the speech recognition data with acoustic models 253, language models 254, FST 255, and/or other data models and information for recognizing the speech conveyed in the audio data. The AFE 256 may reduce noise in the audio data and divide the digitized audio data into frames representing time intervals for which the AFE determines a number of values, called features, representing the qualities of the audio data, along with a set of those values, called a feature vector, representing the features/qualities of the audio data within the frame. Typically audio frames may be 10 ms each. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The ASR engine 258 may process the output from the AFE 256 with reference to information stored in ASR model storage (252). Alternatively, post front-end processed data (such as feature vectors) may be received by the device executing ASR processing from another source besides the internal AFE. For example, the device 110 may process audio data into feature vectors (for example using an on-device AFE 256) and transmit that information to a server across a network 199 for ASR processing. Feature vectors may arrive at the server encoded, in which case they may be decoded prior to processing by the processor executing the ASR engine 258.

The ASR engine 258 attempts to match received feature vectors to language phonemes and words as known in the stored acoustic models 253, language models 254, and FST 255. The ASR engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The ASR engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using finite state transducers (FSTs) explained below, may also be used.

As part of the ASR processing the ASR engine 258 may use acoustic model(s) 253 to attempt to match received audio feature vectors to words or subword units. A subword unit may be a senon, phoneme, phoneme in context, syllable, part of a syllable, syllable in context, or any other such portion of a word. The ASR engine 258 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR module outputs speech results that make sense grammatically.

The ASR engine 258 may use a number of techniques to match feature vectors to phonemes or other phonetic units, such as biphones, triphones, etc. One common technique is using Hidden Markov Models (HMIs). HMMs are used to determine probabilities that feature vectors may match phonemes. Using HMMs, a number of states are presented, in which the states together represent a potential phoneme (or other speech unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the ASR engine 258, the state may change or stay the same, based on the processing of the new feature vectors. A Viterbi algorithm may be used to find the most likely sequence of states based on the processed feature vectors.

In one example, the ASR engine 258 may receive a series of feature vectors for sound corresponding to a user saying "There is a bat in my car." The ASR engine 258 may attempt to match each feature vector with a phoneme. As new feature vectors are processed, the ASR engine 258 may determine state transitions (for example, using HMMs) to determine whether a probability of whether a state should either remain the same, or change to a new state, i.e., whether an incoming feature vector results in a state transition from one phone to another. As the processing continues, the ASR engine 258 continues calculating such state transition probabilities. After processing one feature vector, the speech recognition may move to the next feature vector.

Probabilities and states may be calculated using a number of techniques. For example, probabilities for each state may be calculated using a Gaussian model, Gaussian mixture model, or other technique based on the feature vectors. Techniques such as maximum likelihood estimation (MLE) may be used to estimate the probability of phoneme states.

In addition to calculating potential states for one phoneme as a potential match to a feature vector, the ASR engine 258 may also calculate potential states for other phonemes. In this manner multiple states and state transition probabilities may be calculated.

The probable states and probable state transitions calculated by the ASR engine 258 are formed into paths. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. When combining scores as part of the ASR processing, scores may be multiplied together (or combined in other ways) to reach a desired combined score or probabilities may be converted to the log domain and added to assist processing.

The ASR engine 258 may also compute scores of branches of the paths based on language models or grammars. Language modeling involves determining scores for what words are likely to be used together to form coherent words and sentences. Application of a language model may improve the likelihood that the ASR module 250 correctly interprets the speech contained in the audio data. For example, acoustic model processing returning the potential phoneme paths of "B A T", "B A D", and "B E D" may be adjusted by a language model to adjust the recognition scores of "B A T" (interpreted as the word "bat"), "B A D" (interpreted as the word "bad"), and "B E D" (interpreted as the word "bed") based on the language context of each word within the spoken utterance. The language modeling may be determined from a text corpus and may be customized for particular applications.

As the ASR engine 258 determines potential words from the input audio the lattice may become very large as many potential sounds and words are considered as potential matches for the input audio. The potential matches may be illustrated as a word result network representing possible sequences of words that may be recognized and the likelihood of each sequence. A word result network may consist of sequences of words that may be recognized and the likelihood of each sequence. The likelihood of any path in the word result network may be determined by an acoustic model and a language model.

The ASR engine 258 may return an N-best list of paths along with their respective recognition scores, corresponding to the top N paths as determined by the ASR engine 258. An application (such as a program or component either internal or external to the ASR component 250) that receives the N-best list may then perform further operations or analysis on the list given the list and the associated recognition scores. For example, the N-best list may be used in correcting errors and training various options and processing conditions of the ASR module 250. The ASR engine 258 may compare the actual correct utterance with the best result and with other results on the N-best list to determine why incorrect recognitions received certain recognition scores. The ASR engine 258 may correct its approach (and may update information in the ASR models 252) to reduce the recognition scores of incorrect approaches in future processing attempts.

Various machine learning techniques may be used to train and operate models to perform various steps described herein, such as user recognition feature extraction, encoding, user recognition scoring, user recognition confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The system(s) 120 may also include an action confirmer component 285. The action confirmer component 285 may be configured to process various signals/data from SLU processing of a user input and dialogue history data to determine whether an action responsive to the user input should be performed or a system-generated dialogue should be outputted.

The system(s) 120 may include a dialogue manager 272. The dialogue manager 272 may be configured to track interactions between the user and the system(s) 120 during a dialogue session. The dialogue manager 272 may assign a dialogue session identifier to a user input and may associate the dialogue session identifier to further user inputs during the dialogue session. The dialogue manager 272 may store dialogue history data representing a turn-by-turn interaction between the user and the system(s) 120. For example, the dialogue history data may include data representing a first user input and a first system generated response for a first turn, a second user input and a second system generated response for a second turn, and so on. The dialogue manager 272 may also store dialogue state data representing SLU processing results of the user input that resulted in the system generated response for each turn. The SLU processing results may include ASR data, NLU data, the skill that was selected to respond, and other data. For example, the dialogue state data may include data representing a first ASR hypothesis, a first NLU hypothesis and a first skill for the first turn, a second ASR hypothesis, a second NLU hypothesis, and a second skill for the second turn, and so on.

The system(s) 120 may include an alternate input component 282. The alternate input component 282 may be configured to process a user input to determine an alternative representation(s) of the user input, when the alternate input component 282 determines that the user input is likely to cause friction. The alternative representation(s) may be known to result in output of a desired response to the user input. The alternate input component 282 may determine the alternative representation(s) using data relating to past user inputs, the SLU processing of the past user inputs, and the feedback provided by the user in response to the output. Details on how the alternate input component 282 may determine an alternate representation of a user input are described below in relation to FIG. 7.

The system(s) 120 may include a sentiment detection component 274. The sentiment detection component 274 may be configured to process audio data and/or text data representing an utterance to determine a user's sentiment when speaking the utterance. Details on how the sentiment detection component 274 determines a sentiment corresponding to a user input are described below in relation to FIG. 6.

Figure 3:
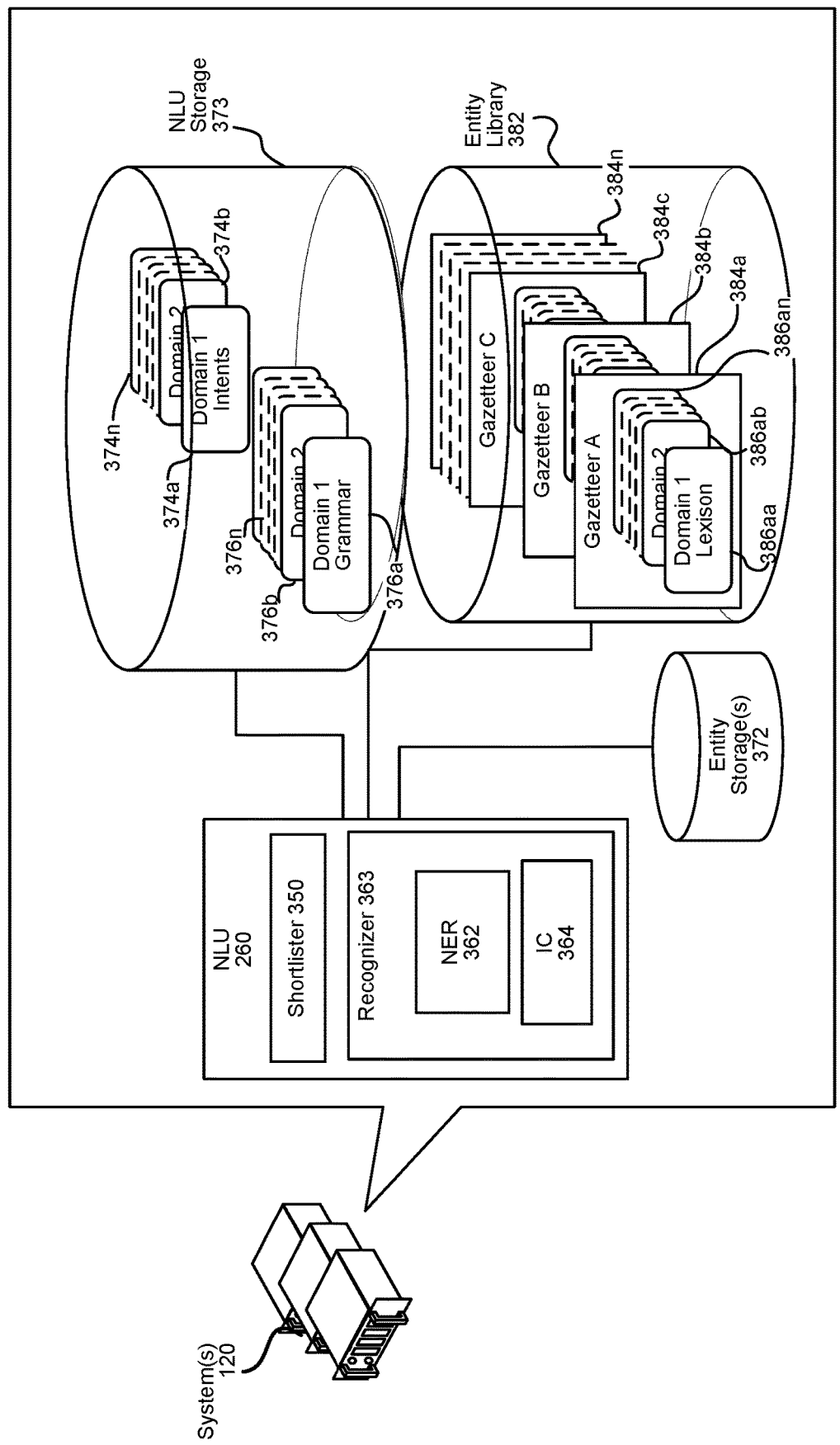
FIG. 3 is a conceptual diagram illustrating how NLU processing may be performed according to embodiments of the present disclosure.

FIG. 3 illustrates how NLU processing is performed on text data. The NLU component 260 may process text data including several ASR hypotheses of a single user input. For example, if the ASR component 250 outputs text data including an n-best list of ASR hypotheses, the NLU component 260 may process the text data with respect to all (or a portion of) the ASR hypotheses represented therein.

The NLU component 260 may annotate text data by parsing and/or tagging the text data. For example, for the text data "tell me the weather for Seattle," the NLU component 260 may tag "tell me the weather for Seattle" as an <OutputWeather> intent as well as separately tag "Seattle" as a location for the weather information.

The NLU component 260 may include a shortlister component 350. The shortlister component 350 selects skills that may execute with respect to text data 410 input to the NLU component 260 (e.g., applications that may execute with respect to the user input). The shortlister component 350 thus limits downstream, more resource intensive NLU processes to being performed with respect to skills that may execute with respect to the user input.

Without a shortlister component 350, the NLU component 260 may process text data 410 input thereto with respect to every skill of the system, either in parallel, in series, or using some combination thereof. By implementing a shortlister component 350, the NLU component 260 may process text data 410 with respect to only the skills that may execute with respect to the user input. This reduces total compute power and latency attributed to NLU processing.

The shortlister component 350 may include one or more trained models. The model(s) may be trained to recognize various forms of user inputs that may be received by the system(s) 120. For example, during a training period skill system(s) 125 associated with a skill may provide the system(s) 120 with training text data representing sample user inputs that may be provided by a user to invoke the skill. For example, for a ride sharing skill, a skill system(s) 125 associated with the ride sharing skill may provide the system(s) 120 with training text data including text corresponding to "get me a cab to [location]," "get me a ride to [location]," "book me a cab to [location]," "book me a ride to [location]," etc. The one or more trained models that will be used by the shortlister component 350 may be trained, using the training text data representing sample user inputs, to determine other potentially related user input structures that users may try to use to invoke the particular skill. During training, the system(s) 120 may solicit the skill system(s) 125 associated with the skill regarding whether the determined other user input structures are permissible, from the perspective of the skill system(s) 125, to be used to invoke the skill. The alternate user input structures may be derived by one or more trained models during model training and/or may be based on user input structures provided by different skills. The skill system(s) 125 associated with a particular skill may also provide the system(s) 120 with training text data indicating grammar and annotations. The system(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 350 may be trained with respect to a different skill. Alternatively, the shortlister component 350 may use one trained model per domain, such as one trained model for skills associated with a weather domain, one trained model for skills associated with a ride sharing domain, etc.

The system(s) 120 may use the sample user inputs provided by a skill system(s) 125, and related sample user inputs potentially determined during training, as binary examples to train a model associated with a skill associated with the skill system(s) 125. The model associated with the particular skill may then be operated at runtime by the shortlister component 350. For example, some sample user inputs may be positive examples (e.g., user inputs that may be used to invoke the skill). Other sample user inputs may be negative examples (e.g., user inputs that may not be used to invoke the skill).

As described above, the shortlister component 350 may include a different trained model for each skill of the system, a different trained model for each domain, or some other combination of trained model(s). For example, the shortlister component 350 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 350 to output indications of only a portion of the skills that the text data 410 may relate to. For example, a user input may correspond to "tell me about Tom Collins." If the model is clustered based on domain, the shortlister component 350 may determine the user input corresponds to a recipe skill (e.g., a drink recipe) even though the user input may also correspond to an information skill (e.g., including information about a person named Tom Collins).

Training the shortlister component 350 may require establishing a "ground truth" for the training examples input therein. The shortlister component 350 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

The NLU component 260 may include one or more recognizers 363. Each recognizer 363 may be associated with a different domain (e.g., smart home, video, music, weather, custom, etc.).

If the shortlister component 350 determines text data 410 is potentially associated with multiple domains, the recognizers 363 associated with the domains may process the text data 410, while recognizers 363 not indicated in the shortlister component 350's output may not process the text data 410. The "shortlisted" recognizers 363 may process the text data 410 in parallel, in series, partially in parallel, etc. For example, if text data 410 potentially relates to both a communications domain and a music domain, a recognizer associated with the communications domain may process the text data 410 in parallel, or partially in parallel, with a recognizer associated with the music domain processing the text data 410.

Each recognizer 363 may include a named entity recognition (NER) component 362. The NER component 362 attempts to identify grammars and lexical information that may be used to construe meaning with respect to text data input therein. The NER component 362 identifies portions of text data that correspond to a named entity associated with a domain, associated with the recognizer 363 implementing the NER component 362. The NER component 362 (or other component of the NLU component 260) may also determine whether a word refers to an entity whose identity is not explicitly mentioned in the text data, for example "him," "her," "it" or other anaphora, exophora, or the like.

Each recognizer 363, and more specifically each NER component 362, may be associated with a particular grammar database 376, a particular set of intents/actions 374, and a particular personalized lexicon 386. Each gazetteer 384 may include domain-indexed lexical information associated with a particular user and/or device 110. For example, a Gazetteer A (384a) includes domain-indexed lexical information 386aa to 386an. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 362 applies grammar information 376 and lexical information 386 associated with a domain (associated with the recognizer 363 implementing the NER component 362) to determine a mention of one or more entities in text data. In this manner, the NER component 362 identifies "slots" (each corresponding to one or more particular words in text data) that may be useful for later processing. The NER component 362 may also label each slot with a type (e.g., noun, place, city, artist name, song name, etc.).

Each grammar database 376 includes the names of entities (i.e., nouns) commonly found in speech about the particular domain to which the grammar database 376 relates, whereas the lexical information 386 is personalized to the user and/or the device 110 from which the user input originated. For example, a grammar database 376 associated with a shopping domain may include a database of words commonly used when people discuss shopping.

A downstream process called entity resolution (discussed in detail elsewhere herein) links a slot of text data to a specific entity known to the system. To perform entity resolution, the NLU component 260 may utilize gazetteer information (384a-384n) stored in an entity library storage 382. The gazetteer information 384 may be used to match text data (representing a portion of the user input) with text data representing known entities, such as song titles, contact names, etc. Gazetteers 384 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 363 may also include an intent classification (IC) component 364. An IC component 364 parses text data to determine an intent(s) (associated with the domain associated with the recognizer 363 implementing the IC component 364) that potentially represents the user input. An intent represents to an action a user desires be performed. An IC component 364 may communicate with a database 374 of words linked to intents. For example, a music intent database may link words and phrases such as "quiet," "volume off," and "mute" to a <Mute> intent. An IC component 364 identifies potential intents by comparing words and phrases in text data (representing at least a portion of the user input) to the words and phrases in an intents database 374 (associated with the domain that is associated with the recognizer 363 implementing the IC component 364).

The intents identifiable by a specific IC component 364 are linked to domain-specific (i.e., the domain associated with the recognizer 363 implementing the IC component 364) grammar frameworks 376 with "slots" to be filled. Each slot of a grammar framework 376 corresponds to a portion of text data that the system believes corresponds to an entity. For example, a grammar framework 376 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 376 may not be structured as sentences, but rather based on associating slots with grammatical tags.

For example, an NER component 362 may parse text data to identify words as subject, object, verb, preposition, etc. based on grammar rules and/or models prior to recognizing named entities in the text data. An IC component 364 (implemented by the same recognizer 363 as the NER component 362) may use the identified verb to identify an intent. The NER component 362 may then determine a grammar model 376 associated with the identified intent. For example, a grammar model 376 for an intent corresponding to <PlayMusic> may specify a list of slots applicable to play the identified "object" and any object modifier (e.g., a prepositional phrase), such as {Artist Name}, {Album Name}, {Song name}, etc. The NER component 362 may then search corresponding fields in a lexicon 386 (associated with the domain associated with the recognizer 363 implementing the NER component 362), attempting to match words and phrases in text data the NER component 362 previously tagged as a grammatical object or object modifier with those identified in the lexicon 386.

An NER component 362 may perform semantic tagging, which is the labeling of a word or combination of words according to their type/semantic meaning. An NER component 362 may parse text data using heuristic grammar rules, or a model may be constructed using techniques such as Hidden Markov Models, maximum entropy models, log linear models, conditional random fields (CRF), and the like. For example, an NER component 362 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 362 identifies "Play" as a verb based on a word database associated with the music domain, which an IC component 364 (also implemented by the music domain recognizer) may determine corresponds to a <PlayMusic> intent. At this stage, no determination has been made as to the meaning of "mother's little helper" or "the rolling stones," but based on grammar rules and models, the NER component 362 has determined the text of these phrases relates to the grammatical object (i.e., entity) of the user input represented in the text data.

An NER component 362 may tag text data to attribute meaning thereto. For example, an NER component 362 may tag "play mother's little helper by the rolling stones" as: {domain} Music, {intent}<PlayMusic>, {artist name} rolling stones, {media type} SONG, and {song title} mother's little helper. For further example, the NER component 362 may tag "play songs by the rolling stones" as: {domain} Music, {intent}<PlayMusic>, {artist name} rolling stones, and {media type} SONG.

Figure 4:
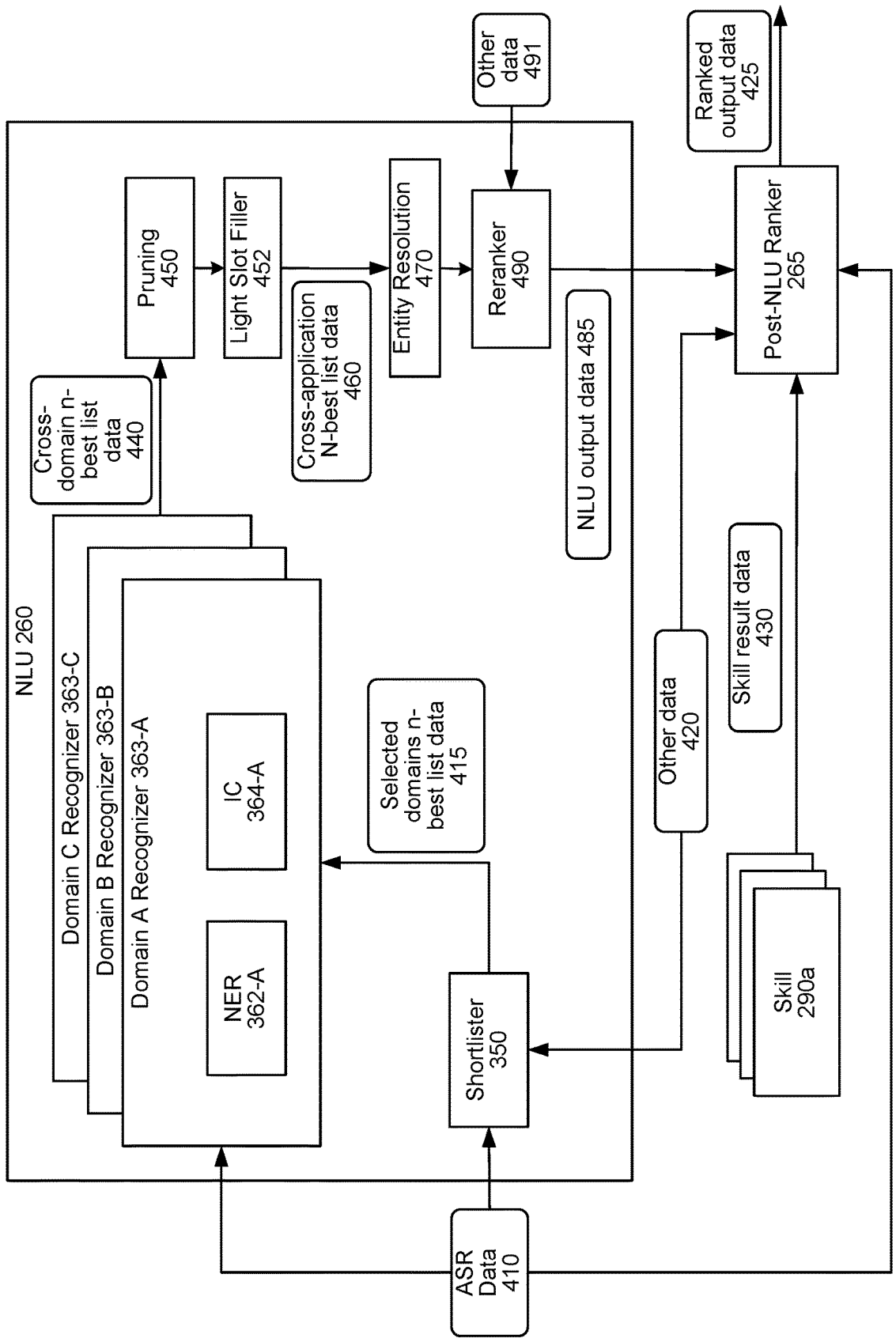
FIG. 4 is a conceptual diagram illustrating how NLU processing may be performed according to embodiments of the present disclosure.

The shortlister component 350 may receive text data 410 output from the ASR component 250 or output from the device 110b (as illustrated in FIG. 4). The ASR component 250 may embed the text data 410 into a form processable by a trained model(s) using sentence embedding techniques as known in the art. Sentence embedding results in the text data 410 including text in a structure that enables the trained models of the shortlister component 450 to operate on the text data 410. For example, an embedding of the text data 410 may be a vector representation of the text data 410.

The shortlister component 350 may make binary determinations (e.g., yes or no) regarding which domains relate to the text data 410. The shortlister component 350 may make such determinations using the one or more trained models described herein above. If the shortlister component 350 implements a single trained model for each domain, the shortlister component 350 may simply run the models that are associated with enabled domains as indicated in a user profile associated with the device 110 and/or user that originated the user input.

The shortlister component 350 may generate n-best list data 415 representing domains that may execute with respect to the user input represented in the text data 410. The size of the n-best list represented in the n-best list data 415 is configurable. In an example, the n-best list data 415 may indicate every domain of the system as well as contain an indication, for each domain, regarding whether the domain is likely capable to execute the user input represented in the text data 410. In another example, instead of indicating every domain of the system, the n-best list data 415 may only indicate the domains that are likely to be able to execute the user input represented in the text data 410. In yet another example, the shortlister component 350 may implement thresholding such that the n-best list data 415 may indicate no more than a maximum number of domains that may execute the user input represented in the text data 410. In an example, the threshold number of domains that may be represented in the n-best list data 415 is ten. In another example, the domains included in the n-best list data 415 may be limited by a threshold a score, where only domains indicating a likelihood to handle the user input is above a certain score (as determined by processing the text data 410 by the shortlister component 350 relative to such domains) are included in the n-best list data 415.

The text data 410 may correspond to more than one ASR hypothesis. When this occurs, the shortlister component 350 may output a different n-best list (represented in the n-best list data 415) for each ASR hypothesis. Alternatively, the shortlister component 350 may output a single n-best list representing the domains that are related to the multiple ASR hypotheses represented in the text data 410.

As indicated above, the shortlister component 350 may implement thresholding such that an n-best list output therefrom may include no more than a threshold number of entries. If the text data 410 includes more than one ASR hypothesis, the n-best list output by the shortlister component 350 may include no more than a threshold number of entries irrespective of the number of ASR hypotheses output by the ASR component 250. Alternatively or in addition, the n-best list output by the shortlister component 350 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the text data 410, the shortlister component 350 may generate confidence scores representing likelihoods that domains relate to the text data 410. If the shortlister component 350 implements a different trained model for each domain, the shortlister component 350 may generate a different confidence score for each individual domain trained model that is run. If the shortlister component 350 runs the models of every domain when text data 410 is received, the shortlister component 350 may generate a different confidence score for each domain of the system. If the shortlister component 350 runs the models of only the domains that are associated with skills indicated as enabled in a user profile associated with the device 110 and/or user that originated the user input, the shortlister component 350 may only generate a different confidence score for each domain associated with at least one enabled skill. If the shortlister component 350 implements a single trained model with domain specifically trained portions, the shortlister component 350 may generate a different confidence score for each domain who's specifically trained portion is run. The shortlister component 350 may perform matrix vector modification to obtain confidence scores for all domains of the system in a single instance of processing of the text data 410.

N-best list data 415 including confidence scores that may be output by the shortlister component 350 may be represented as, for example:

Search domain, 0.67
Recipe domain, 0.62

Information domain, 0.57

Shopping domain, 0.42

As indicated, the confidence scores output by the shortlister component 350 may be numeric values. The confidence scores output by the shortlister component 350 may alternatively be binned values (e.g., high, medium, low).

The n-best list may only include entries for domains having a confidence score satisfying (e.g., equaling or exceeding) a minimum threshold confidence score. Alternatively, the shortlister component 350 may include entries for all domains associated with user enabled skills, even if one or more of the domains are associated with confidence scores that do not satisfy the minimum threshold confidence score.

The shortlister component 350 may consider other data 420 when determining which domains may relate to the user input represented in the text data 410 as well as respective confidence scores. The other data 420 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 420 may include an indicator of the user associated with the text data 410, for example as determined by the user recognition component 295.

The other data 420 may be character embedded prior to being input to the shortlister component 350. The other data 420 may alternatively be embedded using other techniques known in the art prior to being input to the shortlister component 350.

The other data 420 may also include data indicating the domains associated with skills that are enabled with respect to the device 110 and/or user that originated the user input. The shortlister component 350 may use such data to determine which domain-specific trained models to run. That is, the shortlister component 350 may determine to only run the trained models associated with domains that are associated with user-enabled skills. The shortlister component 350 may alternatively use such data to alter confidence scores of domains.

As an example, considering two domains, a first domain associated with at least one enabled skill and a second domain not associated with any user-enabled skills of the user that originated the user input, the shortlister component 350 may run a first model specific to the first domain as well as a second model specific to the second domain. Alternatively, the shortlister component 350 may run a model configured to determine a score for each of the first and second domains. The shortlister component 350 may determine a same confidence score for each of the first and second domains in the first instance. The shortlister component 350 may then alter those confidence scores based on which domains is associated with at least one skill enabled by the present user. For example, the shortlister component 350 may increase the confidence score associated with the domain associated with at least one enabled skill while leaving the confidence score associated with the other domain the same. Alternatively, the shortlister component 350 may leave the confidence score associated with the domain associated with at least one enabled skill the same while decreasing the confidence score associated with the other domain. Moreover, the shortlister component 350 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 270. When the shortlister component 350 receives the text data 410, the shorlister component 350 may determine whether profile data associated with the user and/or device 110 that originated the command includes an indication of enabled skills.

The other data 420 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 350 may use such data to determine which domain-specific trained models to run. For example, if the device 110 corresponds to a displayless type device, the shortlister component 350 may determine not to run trained models specific to domains that output video data. The shortlister component 350 may alternatively use such data to alter confidence scores of domains.

As an example, considering two domains, one that outputs audio data and another that outputs video data, the shortlister component 350 may run a first model specific to the domain that generates audio data as well as a second model specific to the domain that generates video data. Alternatively the shortlister component 350 may run a model configured to determine a score for each domain. The shortlister component 350 may determine a same confidence score for each of the domains in the first instance. The shortlister component 350 may then alter the original confidence scores based on the type of the device 110 that originated the user input corresponding to the text data 410. For example, if the device 110 is a displayless device, the shortlister component 350 may increase the confidence score associated with the domain that generates audio data while leaving the confidence score associated with the domain that generates video data the same. Alternatively, if the device 110 is a displayless device, the shortlister component 350 may leave the confidence score associated with the domain that generates audio data the same while decreasing the confidence score associated with the domain that generates video data. Moreover, if the device 110 is a displayless device, the shortlister component 350 may increase the confidence score associated with the domain that generates audio data as well as decrease the confidence score associated with the domain that generates video data.

The type of device information represented in the other data 420 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 420 may represent the smart TV of other display device, and not the displayless device that captured the spoken user input.

The other data 420 may also include data indicating the user input originating device's speed, location, or other mobility information. For example, the device may correspond to a vehicle including a display. If the vehicle is moving, the shortlister component 350 may decrease the confidence score associated with a domain that generates video data as it may be undesirable to output video content to a user while the user is driving. The device may output data to the system(s) 120 indicating when the device is moving.

The other data 420 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 350 may use such data to alter confidence scores of domains. For example, the shortlister component 350 may run a first model specific to a first domain as well as a second model specific to a second domain. Alternatively, the shortlister component 350 may run a model configured to determine a score for each domain. The shortlister component 350 may also determine a same confidence score for each of the domains in the first instance. The shortlister component 350 may then alter the original confidence scores based on the first domain being invoked to cause the system to output content while the current user input was received. Based on the first domain being invoked, the shortlister component 350 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 415 generated by the shortlister component 350 as well as the different types of other data 420 considered by the shortlister component 350 are configurable. For example, the shortlister component 350 may update confidence scores as more other data 420 is considered. For further example, the n-best list data 415 may exclude relevant domains if thresholding is implemented. Thus, for example, the shortlister component 350 may include an indication of a domain in the n-best list 415 unless the shortlister component 350 is one hundred percent confident that the domain may not execute the user input represented in the text data 410 (e.g., the shortlister component 350 determines a confidence score of zero for the domain).

The shortlister component 350 may send the text data 410 to recognizers 363 associated with domains represented in the n-best list data 415. Alternatively, the shortlister component 350 may send the n-best list data 415 or some other indicator of the selected subset of domains to another component (such as the orchestrator component 230) which may in turn send the text data 410 to the recognizers 363 corresponding to the domains included in the n-best list data 415 or otherwise indicated in the indicator. If the shortlister component 350 generates an n-best list representing domains without any associated confidence scores, the shortlister component 350/orchestrator component 230 may send the text data 410 to recognizers 363 associated with domains that the shortlister component 350 determines may execute the user input. If the shortlister component 350 generates an n-best list representing domains with associated confidence scores, the shortlister component 350/orchestrator component 230 may send the text data 410 to recognizers 363 associated with domains associated with confidence scores satisfying (e.g., meeting or exceeding) a threshold minimum confidence score.

A recognizer 363 may output tagged text data generated by an NER component 362 and an IC component 364, as described herein above. The NLU component 260 may compile the output tagged text data of the recognizers 363 into a single cross-domain n-best list 440 and may send the cross-domain n-best list 440 to a pruning component 450. Each entry of tagged text (e.g., each NLU hypothesis) represented in the cross-domain n-best list data 440 may be associated with a respective score indicating a likelihood that the NLU hypothesis corresponds to the domain associated with the recognizer 363 from which the NLU hypothesis was output. For example, the cross-domain n-best list data 440 may be represented as (with each line corresponding to a different NLU hypothesis):

[0.95] Intent: <PlayMusic> ArtistName: Lady Gaga SongName: Poker Face

[0.70] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface

The pruning component 450 may sort the NLU hypotheses represented in the cross-domain n-best list data 440 according to their respective scores. The pruning component 450 may perform score thresholding with respect to the cross-domain NLU hypotheses. For example, the pruning component 450 may select NLU hypotheses associated with scores satisfying (e.g., meeting and/or exceeding) a threshold score. The pruning component 450 may also or alternatively perform number of NLU hypothesis thresholding. For example, the pruning component 450 may select the top scoring NLU hypothesis(es). The pruning component 450 may output a portion of the NLU hypotheses input thereto. The purpose of the pruning component 450 is to create a reduced list of NLU hypotheses so that downstream, more resource intensive, processes may only operate on the NLU hypotheses that most likely represent the user's intent.

The NLU component 260 may include a light slot filler component 452. The light slot filler component 452 can take text from slots represented in the NLU hypotheses output by the pruning component 450 and alter them to make the text more easily processed by downstream components. The light slot filler component 452 may perform low latency operations that do not involve heavy operations such as reference to a knowledge base. The purpose of the light slot filler component 452 is to replace words with other words or values that may be more easily understood by downstream components. For example, if a NLU hypothesis includes the word "tomorrow," the light slot filler component 452 may replace the word "tomorrow" with an actual date for purposes of downstream processing. Similarly, the light slot filler component 452 may replace the word "CD" with "album" or the words "compact disc." The replaced words are then included in the cross-domain n-best list data 460.

The cross-domain n-best list data 460 may be input to an entity resolution component 470. The entity resolution component 470 can apply rules or other instructions to standardize labels or tokens from previous stages into an intent/slot representation. The precise transformation may depend on the domain. For example, for a travel domain, the entity resolution component 470 may transform text corresponding to "Boston airport" to the standard BOS three-letter code referring to the airport. The entity resolution component 470 can refer to a knowledge base that is used to specifically identify the precise entity referred to in each slot of each NLU hypothesis represented in the cross-domain n-best list data 460. Specific intent/slot combinations may also be tied to a particular source, which may then be used to resolve the text. In the example "play songs by the stones," the entity resolution component 470 may reference a personal music catalog, Amazon Music account, a user profile, or the like. The entity resolution component 470 may output an altered n-best list that is based on the cross-domain n-best list 460 but that includes more detailed information (e.g., entity IDs) about the specific entities mentioned in the slots and/or more detailed slot data that can eventually be used by a skill. The NLU component 260 may include multiple entity resolution components 470 and each entity resolution component 470 may be specific to one or more domains.

The NLU component 260 may include a reranker 490. The reranker 490 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 470.

The reranker 490 may apply re-scoring, biasing, or other techniques. The reranker 490 may consider not only the data output by the entity resolution component 470, but may also consider other data 491. The other data 491 may include a variety of information. For example, the other data 491 may include skill rating or popularity data. For example, if one skill has a high rating, the reranker 490 may increase the score of a NLU hypothesis that may be processed by the skill. The other data 491 may also include information about skills that have been enabled by the user that originated the user input. For example, the reranker 490 may assign higher scores to NLU hypothesis that may be processed by enabled skills than NLU hypothesis that may be processed by non-enabled skills. The other data 491 may also include data indicating user usage history, such as if the user that originated the user input regularly uses a particular skill or does so at particular times of day. The other data 491 may additionally include data indicating date, time, location, weather, type of device 110, user identifier, context, as well as other information. For example, the reranker 490 may consider when any particular skill is currently active (e.g., music being played, a game being played, etc.).

As illustrated and described, the entity resolution component 470 is implemented prior to the reranker 490. The entity resolution component 470 may alternatively be implemented after the reranker 490. Implementing the entity resolution component 470 after the reranker 490 limits the NLU hypotheses processed by the entity resolution component 470 to only those hypotheses that successfully pass through the reranker 490.

The reranker 490 may be a global reranker (e.g., one that is not specific to any particular domain). Alternatively, the NLU component 260 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 260 may perform NLU processing described above with respect to domains associated with skills wholly implemented as part of the system(s) 120 (e.g., designated 290 in FIG. 2A). The NLU component 260 may separately perform NLU processing described above with respect to domains associated with skills that are at least partially implemented as part of the skill system(s) 125. In an example, the shortlister component 350 may only process with respect to these latter domains. Results of these two NLU processing paths may be merged into NLU output data 485, which may be sent to a post-NLU ranker 265, which may be implemented by the system(s) 120.

The post-NLU ranker 265 may include a statistical component that produces a ranked list of intent/skill pairs with associated confidence scores. Each confidence score may indicate an adequacy of the skill's execution of the intent with respect to NLU results data associated with the skill. The post-NLU ranker 265 may operate one or more trained models configured to process the NLU results data 485, skill result data 430, and the other data 420 in order to output ranked output data 425. The ranked output data 425 may include an n-best list where the NLU hypotheses in the NLU results data 485 are reordered such that the n-best list in the ranked output data 425 represents a prioritized list of skills to respond to a user input as determined by the post-NLU ranker 265. The ranked output data 425 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 265 enables the system to better determine the best skill to execute the user input. For example, first and second NLU hypotheses in the NLU results data 485 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 265 (or other scheduling component such as orchestrator component 230) may solicit the first skill and the second skill to provide potential result data 430 based on the first NLU hypothesis and the second NLU hypothesis, respectively. For example, the post-NLU ranker 265 may send the first NLU hypothesis to the first skill 290a along with a request for the first skill 290a to at least partially execute with respect to the first NLU hypothesis. The post-NLU ranker 265 may also send the second NLU hypothesis to the second skill 290b along with a request for the second skill 290b to at least partially execute with respect to the second NLU hypothesis. The post-NLU ranker 265 receives, from the first skill 290a, first result data 430a generated from the first skill 290a's execution with respect to the first NLU hypothesis. The post-NLU ranker 265 also receives, from the second skill 290b, second results data 430b generated from the second skill 290b's execution with respect to the second NLU hypothesis.

The result data 430 may include various portions. For example, the result data 430 may include content (e.g., audio data, text data, and/or video data) to be output to a user. The result data 430 may also include a unique identifier used by the system(s) 120 and/or the skill system(s) 125 to locate the data to be output to a user. The result data 430 may also include an instruction. For example, if the user input corresponds to "turn on the light," the result data 430 may include an instruction causing the system to turn on a light associated with a profile of the device (110a/110b) and/or user.

The post-NLU ranker 265 may consider the first result data 430a and the second result data 430b to alter the first confidence score and the second confidence score of the first NLU hypothesis and the second NLU hypothesis, respectively. That is, the post-NLU ranker 265 may generate a third confidence score based on the first result data 430a and the first confidence score. The third confidence score may correspond to how likely the post-NLU ranker 265 determines the first skill will correctly respond to the user input. The post-NLU ranker 265 may also generate a fourth confidence score based on the second result data 430b and the second confidence score. One skilled in the art will appreciate that a first difference between the third confidence score and the fourth confidence score may be greater than a second difference between the first confidence score and the second confidence score. The post-NLU ranker 265 may also consider the other data 420 to generate the third confidence score and the fourth confidence score. While it has been described that the post-NLU ranker 265 may alter the confidence scores associated with first and second NLU hypotheses, one skilled in the art will appreciate that the post-NLU ranker 265 may alter the confidence scores of more than two NLU hypotheses. The post-NLU ranker 265 may select the result data 430 associated with the skill 290 with the highest altered confidence score to be the data output in response to the current user input. The post-NLU ranker 265 may also consider the text data 410 to alter the NLU hypotheses confidence scores.

The orchestrator component 230 may, prior to sending the NLU results data 485 to the post-NLU ranker 265, associate intents in the NLU hypotheses with skills 290. For example, if a NLU hypothesis includes a <PlayMusic> intent, the orchestrator component 230 may associate the NLU hypothesis with one or more skills 290 that can execute the <PlayMusic> intent. Thus, the orchestrator component 230 may send the NLU results data 485, including NLU hypotheses paired with skills 290, to the post-NLU ranker 265. In response to text data 410 corresponding to "what should I do for dinner today," the orchestrator component 230 may generates pairs of skills 290 with associated NLU hypotheses corresponding to:

Skill 1/NLU hypothesis including <Help> intent
Skill 2/NLU hypothesis including <Order> intent
Skill 3/NLU hypothesis including <DishType> intent The post-NLU ranker 265 queries each skill 290, paired with a NLU hypothesis in the NLU output data 485, to provide result data 430 based on the NLU hypothesis with which it is associated. That is, with respect to each skill, the post-NLU ranker 265 colloquially asks the each skill "if given this NLU hypothesis, what would you do with it." According to the above example, the post-NLU ranker 265 may send skills 290 the following data:

Skill 1: First NLU hypothesis including <Help> intent indicator
Skill 2: Second NLU hypothesis including <Order> intent indicator
Skill 3: Third NLU hypothesis including <DishType> intent indicator The post-NLU ranker 265 may query each of the skills 290 in parallel or substantially in parallel.

A skill 290 may provide the post-NLU ranker 265 with various data and indications in response to the post-NLU ranker 265 soliciting the skill 290 for result data 430. A skill 290 may simply provide the post-NLU ranker 265 with an indication of whether or not the skill can execute with respect to the NLU hypothesis it received. A skill 290 may also or alternatively provide the post-NLU ranker 265 with output data generated based on the NLU hypothesis it received. In some situations, a skill 290 may need further information in addition to what is represented in the received NLU hypothesis to provide output data responsive to the user input. In these situations, the skill 290 may provide the post-NLU ranker 265 with result data 430 indicating slots of a framework that the skill 290 further needs filled or entities that the skill 290 further needs resolved prior to the skill 290 being able to provided result data 430 responsive to the user input. The skill 290 may also provide the post-NLU ranker 265 with an instruction and/or computer-generated speech indicating how the skill 290 recommends the system solicit further information needed by the skill 290. The skill 290 may further provide the post-NLU ranker 265 with an indication of whether the skill 290 will have all needed information after the user provides additional information a single time, or whether the skill 290 will need the user to provide various kinds of additional information prior to the skill 290 having all needed information. According to the above example, skills 290 may provide the post-NLU ranker 265 with the following:

Skill 1: indication representing the skill can execute with respect to a NLU hypothesis including the <Help> intent indicator
Skill 2: indication representing the skill needs to the system to obtain further information
Skill 3: indication representing the skill can provide numerous results in response to the third NLU hypothesis including the <DishType> intent indicator Result data 430 includes an indication provided by a skill 290 indicating whether or not the skill 290 can execute with respect to a NLU hypothesis; data generated by a skill 290 based on a NLU hypothesis; as well as an indication provided by a skill 290 indicating the skill 290 needs further information in addition to what is represented in the received NLU hypothesis.

The post-NLU ranker 265 uses the result data 430 provided by the skills 290 to alter the NLU processing confidence scores generated by the reranker 490. That is, the post-NLU ranker 265 uses the result data 430 provided by the queried skills 290 to create larger differences between the NLU processing confidence scores generated by the reranker 490. Without the post-NLU ranker 265, the system may not be confident enough to determine an output in response to a user input, for example when the NLU hypotheses associated with multiple skills are too close for the system to confidently determine a single skill 290 to invoke to respond to the user input. For example, if the system does not implement the post-NLU ranker 265, the system may not be able to determine whether to obtain output data from a general reference information skill or a medical information skill in response to a user input corresponding to "what is acne."

The post-NLU ranker 265 may prefer skills 290 that provide result data 430 responsive to NLU hypotheses over skills 290 that provide result data 430 corresponding to an indication that further information is needed, as well as skills 290 that provide result data 430 indicating they can provide multiple responses to received NLU hypotheses. For example, the post-NLU ranker 265 may generate a first score for a first skill 290a that is greater than the first skill's NLU confidence score based on the first skill 290a providing result data 430a including a response to a NLU hypothesis.

For further example, the post-NLU ranker 265 may generate a second score for a second skill 290*b* that is less than the second skill's NLU confidence score based on the second skill 290*b* providing result data 430*b* indicating further information is needed for the second skill 290*b* to provide a response to a NLU hypothesis. Yet further, for example, the post-NLU ranker 265 may generate a third score for a third skill 290*c* that is less than the third skill's NLU confidence score based on the third skill 290*c* providing result data 430*c* indicating the third skill 290*c* can provide multiple responses to a NLU hypothesis.

The post-NLU ranker 265 may consider other data 420 in determining scores. The other data 420 may include rankings associated with the queried skills 290. A ranking may be a system ranking or a user-specific ranking. A ranking may indicate a veracity of a skill from the perspective of one or more users of the system. For example, the post-NLU ranker 265 may generate a first score for a first skill 290*a* that is greater than the first skill's NLU processing confidence score based on the first skill 290*a* being associated with a high ranking. For further example, the post-NLU ranker 265 may generate a second score for a second skill 290*b* that is less than the second skill's NLU processing confidence score based on the second skill 290*b* being associated with a low ranking.

The other data 420 may include information indicating whether or not the user that originated the user input has enabled one or more of the queried skills 290. For example, the post-NLU ranker 265 may generate a first score for a first skill 290*a* that is greater than the first skill's NLU processing confidence score based on the first skill 290*a* being enabled by the user that originated the user input. For further example, the post-NLU ranker 265 may generate a second score for a second skill 290*b* that is less than the second skill's NLU processing confidence score based on the second skill 290*b* not being enabled by the user that originated the user input. When the post-NLU ranker 265 receives the NLU results data 485, the post-NLU ranker 265 may determine whether profile data, associated with the user and/or device that originated the user input, includes indications of enabled skills.

The other data 420 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 265 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 265 may increase the NLU processing confidence score associated with a first skill configured to output visual data and/or decrease the NLU processing confidence score associated with a second skill configured to output audio data.

The other data 420 may include information indicating the veracity of the result data 430 provided by a skill 290. For example, if a user says "tell me a recipe for pasta sauce," a first skill 290*a* may provide the post-NLU ranker 265 with first result data 430*a* corresponding to a first recipe associated with a five star rating and a second skill 290*b* may provide the post-NLU ranker 265 with second result data 430*b* corresponding to a second recipe associated with a one star rating. In this situation, the post-NLU ranker 265 may increase the NLU processing confidence score associated with the first skill 290*a* based on the first skill 290*a* providing the first result data 430*a* associated with the five star rating and/or decrease the NLU processing confidence score associated with the second skill 290*b* based on the second skill 290*b* providing the second result data 430*b* associated with the one star rating.

The other data 420 may include information indicating the type of device that originated the user input. For example, the device may correspond to a "hotel room" type if the device is located in a hotel room. If a user inputs a command corresponding to "order me food" to the device located in the hotel room, the post-NLU ranker 265 may increase the NLU processing confidence score associated with a first skill 290*a* corresponding to a room service skill associated with the hotel and/or decrease the NLU processing confidence score associated with a second skill 290*b* corresponding to a food skill not associated with the hotel.

The other data 420 may include information indicating a location of the device and/or user that originated the user input. The system may be configured with skills 290 that may only operate with respect to certain geographic locations. For example, a user may provide a user input corresponding to "when is the next train to Portland." A first skill 290*a* may operate with respect to trains that arrive at, depart from, and pass through Portland, Oreg. A second skill 290*b* may operate with respect to trains that arrive at, depart from, and pass through Portland, Me. If the device and/or user that originated the user input is located in Seattle, Wash., the post-NLU ranker 265 may increase the NLU processing confidence score associated with the first skill 290*a* and/or decrease the NLU processing confidence score associated with the second skill 290*b*. Likewise, if the device and/or user that originated the user input is located in Boston, Mass., the post-NLU ranker 265 may increase the NLU processing confidence score associated with the second skill 290*b* and/or decrease the NLU processing confidence score associated with the first skill 290*a*.

The other data 420 may include information indicating a time of day. The system may be configured with skills 290 that operate with respect to certain times of day. For example, a user may provide a user input corresponding to "order me food." A first skill 290*a* may generate first result data 430*a* corresponding to breakfast. A second skill 290*b* may generate second result data 430*b* corresponding to dinner. If the system(s) 120 receives the user input in the morning, the post-NLU ranker 265 may increase the NLU processing confidence score associated with the first skill 290*a* and/or decrease the NLU processing score associated with the second skill 290*b*. If the system(s) 120 receives the user input in the afternoon or evening, the post-NLU ranker 265 may increase the NLU processing confidence score associated with the second skill 290*b* and/or decrease the NLU processing confidence score associated with the first skill 290*a*.

The other data 420 may include information indicating user preferences. The system may include multiple skills 290 configured to execute in substantially the same manner. For example, a first skill 290*a* and a second skill 290*b* may both be configured to order food from respective restaurants. The system may store a user preference (e.g., in the profile storage 270) that is associated with the user that provided the user input to the system(s) 120 as well as indicates the user prefers the first skill 290*a* over the second skill 290*b*. Thus, when the user provides a user input that may be executed by both the first skill 290*a* and the second skill 290*b*, the post-NLU ranker 265 may increase the NLU processing confidence score associated with the first skill 290*a* and/or decrease the NLU processing confidence score associated with the second skill 290*b*.

The other data 420 may include information indicating system usage history associated with the user that originated the user input. For example, the system usage history may indicate the user originates user inputs that invoke a first skill 290*a* more often than the user originates user inputs that invoke a second skill 290*b*. Based on this, if the present user input may be executed by both the first skill 290*a* and the second skill 290*b*, the post-NLU ranker 265 may increase the NLU processing confidence score associated with the first skill 290*a* and/or decrease the NLU processing confidence score associated with the second skill 290*b*.

The other data 420 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 265 may increase the NLU processing confidence score associated with a first skill 290*a* that generates audio data. The post-NLU ranker 265 may also or alternatively decrease the NLU processing confidence score associated with a second skill 290*b* that generates image data or video data.

The other data 420 may include information indicating how long it took a skill 290 to provide result data 430 to the post-NLU ranker 265. When the post-NLU ranker 265 multiple skills 290 for result data 430, the skills 290 may respond to the queries at different speeds. The post-NLU ranker 265 may implement a latency budget. For example, if the post-NLU ranker 265 determines a skill 290 responds to the post-NLU ranker 265 within a threshold amount of time from receiving a query from the post-NLU ranker 265, the post-NLU ranker 265 may increase the NLU processing confidence score associated with the skill 290. Conversely, if the post-NLU ranker 265 determines a skill 290 does not respond to the post-NLU ranker 265 within a threshold amount of time from receiving a query from the post-NLU ranker 265, the post-NLU ranker 265 may decrease the NLU processing confidence score associated with the skill 290.

It has been described that the post-NLU ranker 265 uses the other data 420 to increase and decrease NLU processing confidence scores associated with various skills 290 that the post-NLU ranker 265 has already requested result data from. Alternatively, the post-NLU ranker 265 may use the other data 420 to determine which skills 290 to request result data from. For example, the post-NLU ranker 265 may use the other data 420 to increase and/or decrease NLU processing confidence scores associated with skills 290 associated with the NLU results data 485 output by the NLU component 260. The post-NLU ranker 265 may select n-number of top scoring altered NLU processing confidence scores. The post-NLU ranker 265 may then request result data 430 from only the skills 290 associated with the selected n-number of NLU processing confidence scores.

As described, the post-NLU ranker 265 may request result data 430 from all skills 290 associated with the NLU results data 485 output by the NLU component 260. Alternatively, the system(s) 120 may prefer result data 430 from skills implemented entirely by the system(s) 120 rather than skills at least partially implemented by the skill system(s) 125. Therefore, in the first instance, the post-NLU ranker 265 may request result data 430 from only skills associated with the NLU results data 485 and entirely implemented by the system(s) 120. The post-NLU ranker 265 may only request result data 430 from skills associated with the NLU results data 485, and at least partially implemented by the skill system(s) 125, if none of the skills, wholly implemented by the system(s) 120, provide the post-NLU ranker 265 with result data 430 indicating either data response to the NLU results data 485, an indication that the skill can execute the user input, or an indication that further information is needed.

As indicated above, the post-NLU ranker 265 may request result data 430 from multiple skills 290. If one of the skills 290 provides result data 430 indicating a response to a NLU hypothesis and the other skills provide result data 430 indicating either they cannot execute or they need further information, the post-NLU ranker 265 may select the result data 430 including the response to the NLU hypothesis as the data to be output to the user. If more than one of the skills 290 provides result data 430 indicating responses to NLU hypotheses, the post-NLU ranker 265 may consider the other data 420 to generate altered NLU processing confidence scores, and select the result data 430 of the skill associated with the greatest score as the data to be output to the user.

A system that does not implement the post-NLU ranker 265 may select the highest scored NLU hypothesis in the NLU results data 485. The system may send the NLU hypothesis to a skill 290 associated therewith along with a request for output data. In some situations, the skill 290 may not be able to provide the system with output data. This results in the system indicating to the user that the user input could not be processed even though another skill associated with lower ranked NLU hypothesis could have provided output data responsive to the user input.

The post-NLU ranker 265 reduces instances of the aforementioned situation. As described, the post-NLU ranker 265 queries multiple skills associated with the NLU results data 485 to provide result data 430 to the post-NLU ranker 265 prior to the post-NLU ranker 265 ultimately determining the skill 290 to be invoked to respond to the user input. Some of the skills 290 may provide result data 430 indicating responses to NLU hypotheses while other skills 290 may providing result data 430 indicating the skills cannot provide responsive data. Whereas a system not implementing the post-NLU ranker 265 may select one of the skills 290 that could not provide a response, the post-NLU ranker 265 only selects a skill 290 that provides the post-NLU ranker 265 with result data corresponding to a response, indicating further information is needed, or indicating multiple responses can be generated.

The post-NLU ranker 265 may select result data 430, associated with the skill 290 associated with the highest score, for output to the user. Alternatively, the post-NLU ranker 265 may output ranked output data 425 indicating skills 290 and their respective post-NLU ranker rankings. Since the post-NLU ranker 265 receives result data 430, potentially corresponding to a response to the user input, from the skills 290 prior to post-NLU ranker 265 selecting one of the skills or outputting the ranked output data 425, little to no latency occurs from the time skills provide result data 430 and the time the system outputs responds to the user.

If the post-NLU ranker 265 selects result audio data to be output to a user and the system determines content should be output audibly, the post-NLU ranker 265 (or another component of the system(s) 120) may cause the device 110a and/or the device 110b to output audio corresponding to the result audio data. If the post-NLU ranker 265 selects result text data to output to a user and the system determines content should be output visually, the post-NLU ranker 265 (or another component of the system(s) 120) may cause the device 110b to display text corresponding to the result text data. If the post-NLU ranker 265 selects result audio data to output to a user and the system determines content should be output visually, the post-NLU ranker 265 (or another component of the system(s) 120) may send the result audio data to the ASR component 250. The ASR component 250 may generate output text data corresponding to the result audio data. The system(s) 120 may then cause the device 110b to display text corresponding to the output text data. If the post-NLU ranker 265 selects result text data to output to a user and the system determines content should be output audibly, the post-NLU ranker 265 (or another component of the system(s) 120) may send the result text data to the TTS component 280. The TTS component 280 may generate output audio data (corresponding to computer-generated speech) based on the result text data. The system(s) 120 may then cause the device 110a and/or the device 110b to output audio corresponding to the output audio data.

As described, a skill 290 may provide result data 430 either indicating a response to the user input, indicating more information is needed for the skill 290 to provide a response to the user input, or indicating the skill 290 cannot provide a response to the user input. If the skill 290 associated with the highest post-NLU ranker score provides the post-NLU ranker 265 with result data 430 indicating a response to the user input, the post-NLU ranker 265 (or another component of the system(s) 120, such as the orchestrator component 230) may simply cause content corresponding to the result data 430 to be output to the user. For example, the post-NLU ranker 265 may send the result data 430 to the orchestrator component 230. The orchestrator component 230 may cause the result data 430 to be sent to the device (110a/110b), which may output audio and/or display text corresponding to the result data 430. The orchestrator component 230 may send the result data 430 to the ASR component 250 to generate output text data and/or may send the result data 430 to the TTS component 280 to generate output audio data, depending on the situation.

The skill 290 associated with the highest post-NLU ranker score may provide the post-NLU ranker 265 with result data 430 indicating more information is needed as well as instruction data. The instruction data may indicate how the skill 290 recommends the system obtain the needed information. For example, the instruction data may correspond to text data or audio data (i.e., computer-generated speech) corresponding to "please indicate." The instruction data may be in a format (e.g., text data or audio data) capable of being output by the device (110a/110b). When this occurs, the post-NLU ranker 265 may simply cause the received instruction data be output by the device (110a/110b). Alternatively, the instruction data may be in a format that is not capable of being output by the device (110a/110b). When this occurs, the post-NLU ranker 265 may cause the ASR component 250 or the TTS component 280 to process the instruction data, depending on the situation, to generate instruction data that may be output by the device (110a/110b). Once the user provides the system with all further information needed by the skill 290, the skill 290 may provide the system with result data 430 indicating a response to the user input, which may be output by the system as detailed above.

The system may include "informational" skills 290 that simply provide the system with information, which the system outputs to the user. The system may also include "transactional" skills 290 that require a system instruction to execute the user input. Transactional skills 290 include ride sharing skills, flight booking skills, etc. A transactional skill 290 may simply provide the post-NLU ranker 265 with result data 430 indicating the transactional skill 290 can execute the user input. The post-NLU ranker 265 may then cause the system to solicit the user for an indication that the system is permitted to cause the transactional skill 290 to execute the user input. The user-provided indication may be an audible indication or a tactile indication (e.g., activation of a virtual button or input of text via a virtual keyboard). In response to receiving the user-provided indication, the system may provide the transactional skill 290 with data corresponding to the indication. In response, the transactional skill 290 may execute the command (e.g., book a flight, book a train ticket, etc.). Thus, while the system may not further engage an informational skill 290 after the informational skill 290 provides the post-NLU ranker 265 with result data 430, the system may further engage a transactional skill 290 after the transactional skill 290 provides the post-NLU ranker 265 with result data 430 indicating the transactional skill 290 may execute the user input.

In some instances, the post-NLU ranker 265 may generate respective scores for first and second skills that are too close (e.g., are not different by at least a threshold difference) for the post-NLU ranker 265 to make a confident determination regarding which skill should execute the user input. When this occurs, the system may request the user indicate which skill the user prefers to execute the user input. The system may output TTS-generated speech to the user to solicit which skill the user wants to execute the user input.

Figure 5:
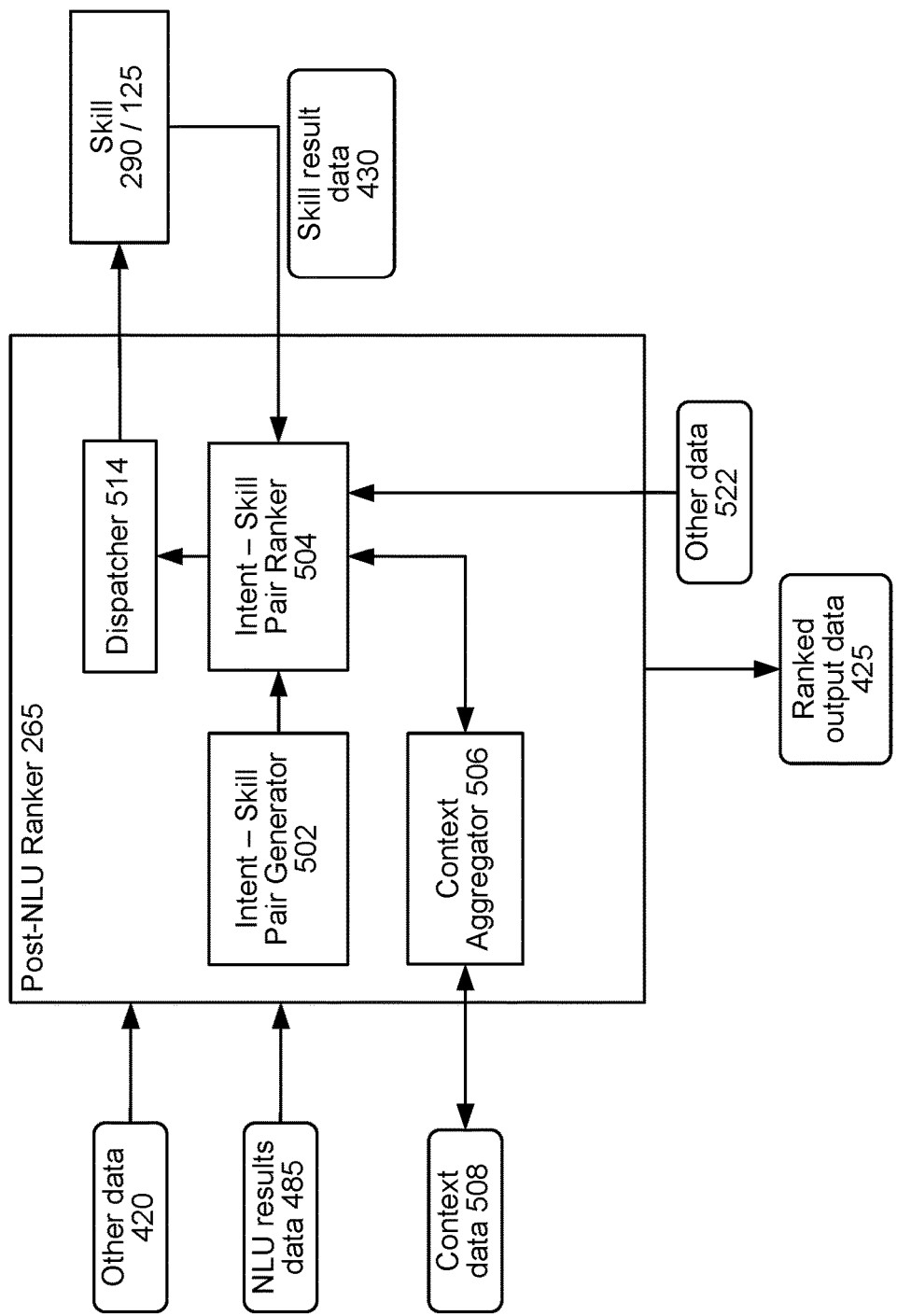
FIG. 5 is a conceptual diagram illustrating how a post-NLU ranker may process according to embodiments of the present disclosure.

FIG. 5 illustrates other configurations and operations of the post-NLU ranker 265. When the post-NLU ranker 265 receives NLU results data 485, the NLU results data 485 may be sent to an intent-skill pair generator 502. The intent-skill pair generator 502 may include information about what skills are capable of handling what intents. Such information may be context agnostic, and may thus indicate what skills are capable of handling what intents generally, without regard to the context associated with the user input. The intent-skill pair generator 502 thus receives the NLU results data 485 and identifies what particular candidate skills may handle the intent for NLU hypothesis. For example, if a NLU hypothesis includes a particular intent, the intent-skill pair generator 502 identifies each skill that may execute with respect to the intent. For further example, if the NLU results data 485 include multiple NLU hypotheses including multiple intents, the intent-skill pair generator 502 associates each different NLU hypothesis with each skill that may execute with respect to the NLU hypothesis. As illustrated, the intent-skill pair generator 502 may be implemented at part of the post-NLU ranker 265. However, one skill in the art will appreciate that the intent-skill pair generator 502 may be implemented as part of the NLU component 260 or in another component without departing from the present disclosure. In such a case, the NLU results data 485 may include intent-skill pairs.

The post-NLU ranker 265 may also include an intent-skill pair ranker 504. The intent-skill pair ranker 504 ranks the intent-skill pairs generated by the intent-skill pair generator 502 based on, for example, the number of filled slots of a NLU hypothesis, an NLU confidence score associated with a NLU hypothesis, context information output by a context aggregator 506, and/or other data.

The post-NLU ranker 265 may include the context aggregator 506. The context aggregator 506 receives context data 508 from various contextual sources. The context data 508 may include time data, which represents a time of receipt of the user input by the device 110, a time or receipt of the user input by the system(s) 120, a user identifier associated with the user input, a device identifier of the device 110, whether other devices are linked to the device 110, and/or other information. The context aggregator 506 may aggregate the context data 508 and put the context data 508 in a form that can be processed by the intent-skill pair ranker 504. Context data 508 may include data obtained from the device 110 or from other services connected to the system(s) 120.

The context data 508 may include skill availability data. Such information may indicate what skills are available and authorized to process the user input. For example, if the user has only enabled certain skills, the enabled skills may be noted in the skill availability data.

The context data 508 may also include dialogue data. A "dialogue" or "dialogue session" as used herein may refer to data transmissions (such as relating to multiple user inputs and system(s) 120 outputs) between the system(s) 120 and a local device (e.g., the device 110) that all relate to a single originating user input. Thus, the data transmissions of a dialogue session may share a dialogue identifier or other unique identifier that may be used by the orchestrator component 230, skill(s) 290, skill server(s) 125, etc. to track information across the dialogue session. For example, the device 110 may send the system(s) 120 data corresponding to "Alexa, play jeopardy." The system(s) 120 may output data corresponding to a jeopardy statement to the device 110 for output to a user(s). A user may then respond to the statement, which the device 110 sends as data to the system(s) 120. The sending of data from the device 110 to the system(s) 120 and the sending of data from the system(s) 120 to the device 110 may all correspond to a single dialogue session related to the originating user input "play jeopardy." In some examples, a dialogue-initiating user input may start with a wakeword and end with a command, such as "Alexa, play jeopardy," where "Alexa" is the wakeword and "play jeopardy" is the command. Subsequent user inputs of the same dialogue session may or may not start with speaking of a wakeword. Each user input of a dialogue may be associated with a unique user input identifier such that multiple user input identifiers may be associated with a single dialogue session identifier.

Dialogue data may include interactive focus information, (e.g., representing which skill was most recently invoked to execute a previous user input for the user and/or device 110 associated with the present user input). Dialogue data may also include content focus information (e.g., representing a skill that is streaming data to the device 110 when the data corresponding to the current user input is received by the system(s) 120). The context data 508 may be one portion of the data used by the intent-skill pair ranker 504 to determine which skill should execute the current user input. Thus, unlike certain systems that use interactive focus and content focus as binary determinations regarding which skill should execute a current user input, the presently disclosed architecture considers focus along with other data, thereby minimizing disproportionate routing.

The context data 508 may also include device data. Device data may indicate characteristics of the device 110 from which the user input was received. For example, such data may include information such as display capabilities of the device, a quality of one or more speakers of the device, a device type, etc. Certain capabilities of a solo device or group of devices may be stored with the system and looked up during a particular interaction to determine if a device/group of devices can handle a go-back request. Device data may also represent a skill with which the device 110 is associated. The device data may also indicate whether the device 110 is currently streaming data or was streaming data when the user input was received and sent to the system(s) 120. The context data 508 (and/or other data 522) may include a metadata flag/indicator that represents whether the particular skill being executed is one that can handle a go-back (or other navigational) request.

The context data 508 may also include user profile data. The user profile data may represent preferences and/or characteristics of the user that originated the current user input. Such data may be received from the profile storage 270.

The context data 508 may also include location data. The location data may represent a location of the device 110 from which the user input was received.

The context data 508 may also include anaphora data. Anaphora data may be data used to resolve anaphora, exophora, or other references (like pronouns such as he, she, etc.) to entities that are not explicitly named in a user input. The anaphora data may include entity identifiers or other information used to resolve anaphoric references in a user input.

The context data 508 may also include data regarding whether one or more skills are "in focus." A skill may be in interactive focus, meaning the skill was the most recent skill that executed a user input for a user or device associated with a present user input and/or the skill may be involved with an open dialogue (e.g., series of user inputs and responses) with a user device. Interactive focus attempts to continue a conversation between a user and the system and/or a skill for purposes of processing the dialogue. However, there may be instances where a user inputs a command that may be handled by a skill that is currently in interactive focus, but which the user does not intend to be executed by such skill. The system may process the context data 508 and other data to determine how best to process a user input when one or more skills may be in focus.

A skill may alternatively be in content focus, meaning the skill is associated with content that is streaming to the user and/or device associated with a current user input when the current user input is received by the system. For example, a previous user input of "Play music" may result in the system streaming music to a device from a specific music skill. While the skill is streaming the music, the same user may input a second user input. Since the second user input was received when the music skill was streaming the music, the system may query that music skill in the first instance, even if the second user input is not necessarily intended for the music skill. The music skill may be configured to attempt to execute the subsequent user input (and potentially output an error) even though the user may have intended another skill to execute such user input.

The context data 508 may also include other context data not explicitly recited herein.

The intent-skill pair ranker 504 may operate one or more trained models that are configured to process the NLU results data 485, skill result data 430, and other data 522 in order to determine a single best skill for executing the current user input from the available pairs output by the intent-skill pair generator 502. The intent-skill pair ranker 504 may send queries to the skills and request a first skill and a second skill (for example the candidate skills identified by the pair generator 502), to provide potential result data indicating whether the skill can handle the intent at the particular moment and if so, what the output data for the particular skill would be (e.g., data the skill would provide to a user if the skill were selected to execute the user input) based on the NLU results data 485. For example, the intent-skill pair ranker 504 may send a first NLU hypothesis, associated with a first skill, to the first skill along with a request for the first skill to at least partially execute with respect to the first NLU hypothesis. The intent-skill pair ranker 504 may also send a second NLU hypothesis, associated with the second skill, to the second skill along with a request for the second skill to at least partially execute with respect to the second NLU hypothesis. The intent-skill pair ranker 504 receives, from the first skill, first result data 430a generated from the first skill's execution with respect to the first NLU hypothesis. The intent-skill pair ranker 504 also receives, from the second skill, second results data 430b generated from the second skill's execution with respect to the second NLU hypothesis. Based on the first results data 430a, a first NLU confidence score associated with the first NLU hypothesis, the second results data 430b, a second NLU confidence score associated with the second NLU hypothesis, and other data 522 (e.g., context data, user profile data, etc.), the intent-skill pair ranker 504 determines the best skill for executing the current user input. The intent-skill pair ranker 504 sends an indication of the best skill to a dispatcher component 514.

The dispatcher 514 may then send the selected skill the information needed to execute the user input, including an indication of the intent, the appropriate context data 508 (such as device identifier, user identifier, or the like), slot data, utterance identifier, dialogue identifier, or any other information needed.

One or more models implemented by components of the orchestrator component 230, post-NLU ranker 265, short-lister 350, or other component may be trained and operated according to various machine learning techniques.

Figure 6:
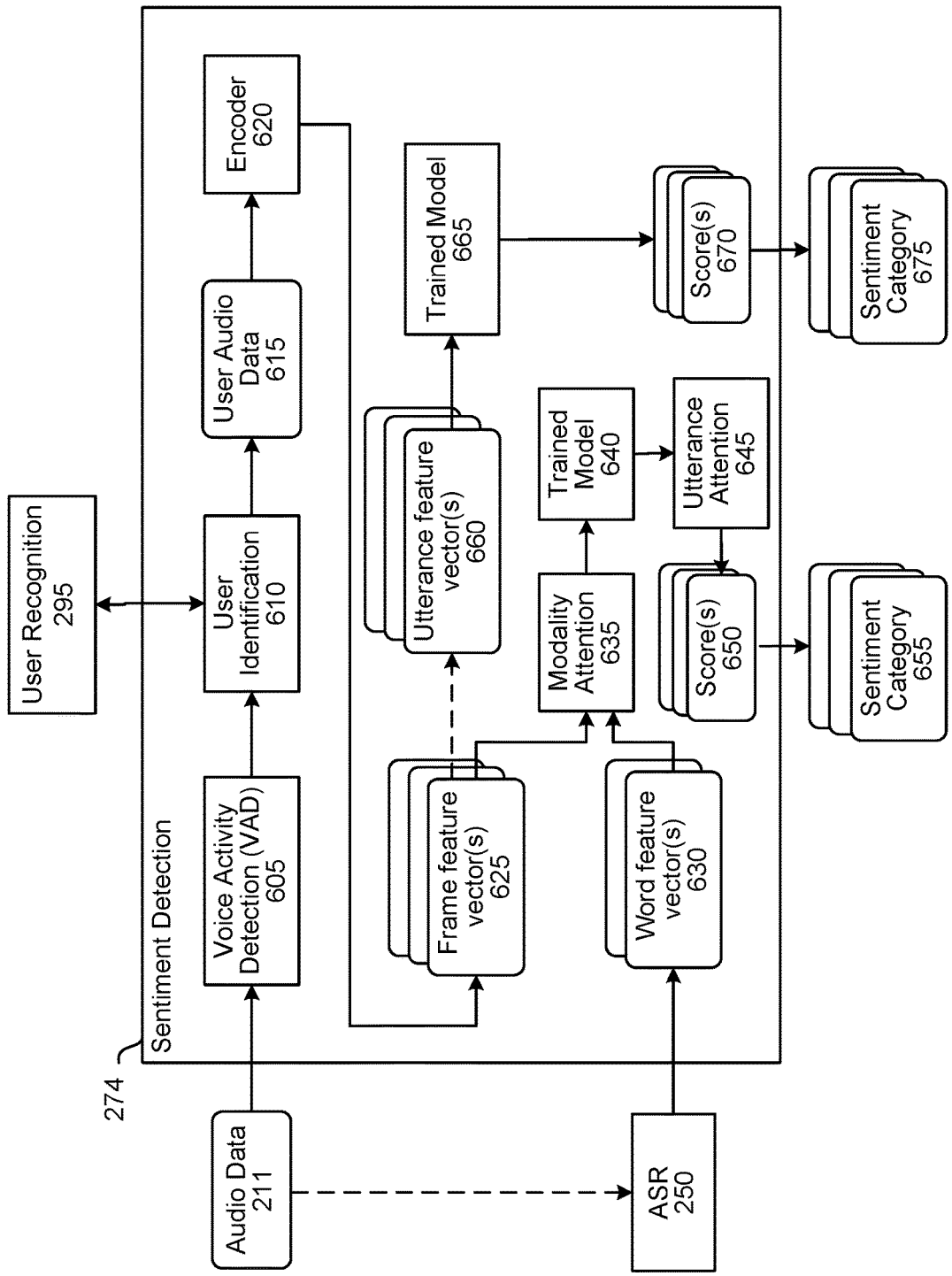
FIG. 6 is a conceptual diagram illustrating a sentiment detection component according to embodiments of the present disclosure.

FIG. 6 is a conceptual diagram illustrating a sentiment detection component 274 according to embodiments of the present disclosure. The sentiment detection component 274 may include a voice activity detection (VAD) component 605, a user identification component 610, a trained model component 640 and a trained model component 665. The audio data 211 captured by a device 110 may be inputted into the VAD component 605.

The VAD component 605 may determine if the audio data 211 includes speech spoken by a human or voice activity by a human, and may determine a portion of the audio data 211 that includes speech or voice activity. The VAD component 605 may send the portion of the audio data 211 including speech or voice activity to the user identification component 610. The VAD component 605 may employ voice activity detection techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the VAD component 605 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

The user identification component 610 may communicate with the user recognition component 295 to determine user audio data 615 that corresponds to a particular user profile. The user recognition component 295 may recognize one or more users as described above. The user audio data 615 may be a portion of the audio data 211 that includes speech or one or more utterances from a particular user associated with the user profile. In other words, audio data representing a particular user's speech may be isolated and stored as the user audio data 615 for further analysis. In an example embodiment, the user may be associated with or using the device 110, and may have provided permission to the system to record and analyze his or her voice/conversations to determine a sentiment category corresponding to the conversation.

The user audio data 615 may be inputted into an encoder 620 to determine frame feature vector(s) 625. The frame feature vector(s) 625 may represent audio frame level features extracted from the user audio data 615. One frame feature vector 625 may represent audio frame level features for an audio frame of 20 ms of the user audio data 615. The frame feature vector(s) 625 may be derived by spectral analysis of the user audio data 615.

In some embodiments, the frame feature vector(s) 625 may be used to determine utterance feature vector(s) 660 representing utterance-level features of one or more utterances represented in the user audio data 615. The utterance feature vector(s) 660 may be determined by performing statistics calculations, delta calculation and other processing on the frame feature vector(s) 625 for the audio frames corresponding to an utterance of interest. As such, the utterance feature vector(s) 660 may be a feature matrix whose dimensions are based on the number of audio frames corresponding to the utterance of interest and the dimension of the corresponding frame feature vector 625. The utterance feature vector(s) 660 may be a high-level function or other mathematical functions representing the utterance-level features.

The trained model component 640 may process the frame feature vector(s) 625 using a convolutional neural network (CNN). The trained model component 640 may output score(s) 650 indicating a sentiment category 655 for the user audio data 615. The sentiment detection component 274 may predict one of several sentiment. In an example embodiment, the sentiment categories may be positive, neutral, and negative.

The trained model component 665 may process the utterance feature vector(s) 660 using a fully-connected neural network. The trained model component 665 may output score(s) 670 indicating a sentiment category 675 for the user audio data 615.

The machine learning model for the trained model component 640, 665 may take many forms, including a neural network. The trained model component 640 may employ a convolutional neural network. The trained model component 665 may employ a fully-connected neural network. In some examples, a neural network may include a number of layers, from input layer 1 through output layer N. Each layer is configured to output a particular type of data and output another type of data. Thus, a neural network may be configured to input data of type data A (which is the input to layer 1) and output data of type data Z (which is the output from the last layer N). The output from one layer is then taken as the input to the next layer. For example, the output data (data B) from layer 1 is the input data for layer 2 and so forth such that the input to layer N is data Y output from a penultimate layer.

While values for the input data/output data of a particular layer are not known until a neural network is actually operating during runtime, the data describing the neural network describes the structure and operations of the layers of the neural network.

In some examples, a neural network may be structured with an input layer, middle layer(s), and an output layer. The middle layer(s) may also be known as the hidden layer(s). Each node of the hidden layer is connected to each node in the input layer and each node in the output layer. In some examples, a neural network may include a single hidden layer, although the disclosure is not limited thereto and the neural network may include multiple middle layers without departing from the disclosure. In this case, each node in a hidden layer will connect to each node in the next higher layer and next lower layer. Each node of the input layer represents a potential input to the neural network and each node of the output layer represents a potential output of the neural network. Each connection from one node to another node in the next layer may be associated with a weight or score. A neural network may output a single output or a weighted set of possible outputs.

In one aspect, the neural network may be constructed with recurrent connections such that the output of the hidden layer of the network feeds back into the hidden layer again for the next set of inputs. For example, each node of the input layer may connect to each node of the hidden layer, and each node of the hidden layer may connect to each node of the output layer. In addition, the output of the hidden layer may be fed back into the hidden layer for processing of the next set of inputs. A neural network incorporating recurrent connections may be referred to as a recurrent neural network (RNN).

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data. In some circumstances, the neural network may be trained with an entire lattice to improve speech recognition when the entire lattice is processed.

Ambiguity in SLU processing may be caused for various reasons. For example, the a true ambiguity may exist because the user request is open-ended, does not include enough details/information, contextual data (user profile data, past interaction data, user preferences, device type, time/day of request receipt, etc.) does not provide enough context to resolve the ambiguities, etc. Such ambiguities may be reflected in the NLU data where multiple NLU hypothesis may be determined and no one NLU hypothesis has a high enough confidence score, and/or in the post-NLU ranking data where multiple skills may be determined as capable of responding to the user request.

In another example, the ambiguity may be caused by the user's environment or the way the user speaks the user input, and the quality of the audio captured by the device. The captured audio may have certain characteristics such as high signal-to-noise ratio caused by background noise, low audio signal/energy caused by the user speaking softly or being far from the device microphone, etc. Such audio characteristics may be represented in the signal quality data. Such audio characteristics may also result in the system being unable to determine what the user said, causing the ASR component to generate multiple ASR hypotheses with no one ASR hypothesis having a high enough confidence score.

In another example, the ambiguity may be caused by the system due to errors in data labeling, modeling uncertainty, gaps in knowledge/functionalities, etc. Such ambiguity may be reflected in the ASR data and the NLU data, both including multiple hypotheses indicating the system being unable to determine what the user said and what the user intended. Such ambiguity may also be reflected in multiple FSTs being selected as applicable for processing the user input.

All these ambiguities may cause the SLU system to perform an action that the user did not expect, and in hopes to get the system to respond as expected, the user may repeat the request/input. The system may respond by repeating the action because processing the repeated user input results in the same or similar ASR/NLU data as the processing of the previous user input. The system of the present disclosure responds with a dialogue, instead of repeating performance of the action, where the dialogue either confirms performance of the prior action or offers an alternative action.

The action confirmer component 285 is configured to detect ambiguities in the SLU processing of a user input which may cause friction during a user interaction with the SLU system(s) 120. The action confirmer component 285 is also confirmed to detect user frustration and generate responses accordingly.

Certain ambiguities may be the result of the characteristics of the audio data/signal captured by the device 110. Poor or low quality audio data may be captured by the device 110 due to various reasons. For example, the background noise near/around the user/device 110 may be included in the audio data 211, and the ASR component 250 may be unable to determine (with a certain level of confidence) what the user said. In this case, the action confirmer component 285 may determine using signal quality data 702 that the audio data 211 is causing ambiguities, and may output a system request dialogue asking the user to speak louder and repeat the user input, instead of attempting to perform an action or attempting to disambiguate. In another example, the audio data 211 may include low energy levels and the ASR component 250 may not be able to determine what the user said. In this case, the action confirmer component 285 may determine using the signal quality data 702 that the user is too far from the microphone/device 110, and may ask the user to move closer to the device and repeat the user input.

Thus, in one example, rather than performing an action or attempting to disambiguate or preconfirm the system(s) 120 understanding of the user input, the action confirmer component 285 asks the user to repeat the user input (in a louder manner and/or by moving closer to the device) in an attempt to capture better audio data to perform ASR. The action confirmer component 285 may use various signals to make this determination, including, signal quality data 702, audio data 211, and others. The action confirmer component 285 may respond to the user input by outputting a system request dialogue, such as, "Sorry I couldn't hear that, could you speak louder?", "Could you repeat that a little louder?", "Sorry I can't hear you, could you move a little closer?", etc.

In another example, ambiguities may be caused by the system, in particular, the vocabulary that the ASR component 250 is configured to recognize. If the user input includes words that the ASR component 250 is not configured to identify, then the ASR component 250 may be unable to determine, with a certain level of confidence, what the user said. In this case, the action confirmer component 285 may receive a signal from the ASR component 250 indicating that there may be one or more out-of-vocabulary words included in the user input, and based on that signal, the action confirmer component 285 may determine to ask the user to repeat or rephrase the user input, instead of attempting to disambiguate or preconfirm.

In some cases, the user may be frustrated, annoyed, angry, disappointed, or otherwise feel some negative sentiment in response to the system's response to the user input. Such sentiments may be caused when the system generates a response the user did not expect because the system misunderstood what the user said. In some cases, the user may repeat the user input while exhibiting frustration (or other negative sentiments). The action confirmer component 285 may determine that the user repeated the previous user input and is exhibiting frustration, and may output a confirmation dialogue, a disambiguation dialogue or other type of output to reduce the user frustration, instead of repeating the previous system response that caused the user frustration. To make such a determination, the action confirmer component 285 may use dialogue history data representing the user inputs and system-generated responses for previous turns of the dialogue session. The action confirmer component 285 may also use sentiment data corresponding to the user input(s).

In one example, the system may process the user input and perform an action responsive to the user input. The user may interrupt the system by providing another user input while the system is performing action, the other user input may ask the system to cancel or otherwise stop the action. After cancelling the action, the user may provide a subsequent user input or the user may interrupt the system while performing the action with the subsequent user input. The subsequent user input may be a repeat of the previous/initial user input. The user may also exhibit some frustration while providing the subsequent user input. Based on the subsequent user input being a repeat and the user exhibiting frustration, the action confirmer component 285 may respond by outputting a confirmation dialogue to confirm the action the user wants the system to perform, instead of responding by performing the action. An example dialogue exchange illustrating this case is below:

User: n.b.c. app
System: "Here's NBC" [launches NBC app on the device]
User: n.b.c. app [with frustration]
System: "I might have misunderstood you. You want me to launch the NBC app, right?"
User: no In another example, the system may detect frustration from a user while repeating a user input, and may output a confirmation including an alternative action, instead of performing the previous action. The system may process an initial user input using SLU processing, and may determine a first/best NLU hypothesis corresponding to the user input and a second best NLU hypothesis corresponding to the user input. The system may respond to the initial user input by performing an action corresponding to the best NLU hypothesis. In response to the system performing the action, the user may provide a subsequent user input. The action confirmer component 285, using dialogue history data and sentiment data, may determine that the subsequent user input is a repeat of the initial user input and the user exhibited frustration. Based on this determination, the action confirmer component 285, instead of repeating the previous action corresponding to the best NLU hypothesis, may output a confirmation including a representation of the second best NLU hypothesis or a representation of the action corresponding to the second best NLU hypothesis. In this manner, instead of repeating the previous action, the system realizes that the user is frustrated and offers an alternative (e.g., the next best NLU hypothesis) to the user. An example dialogue exchange illustrating this case is below:

User: play frozen two
System: "Playing Trolls soundtrack" [output audio corresponding to Trolls soundtrack]
User: play frozen two [with frustration]
System: "I might have misunderstood you. Did you want me to play Frozen Two instead?"
User: Yes The action confirmer component 285 may determine to offer an alternative if the second best NLU hypothesis meets a certain condition (e.g., exceeds a threshold confidence level). If the NLU component 260 did not determine another NLU hypothesis with a certain level of confidence, then the action confirmer component 285 may output a confirmation with the best NLU hypothesis. That is, the system may preconfirm the previous action as described in the above example.

In another case, the system may adapt the response to a user input when the negative sentiment is detected based on the content of the user input. For example, a user may provide an initial user input and the system may respond by performing an action responsive to the user input, or may output a disambiguation or confirmation dialogue prior to performing an action responsive to the user input. In response, the user may provide a subsequent user input including negative sentiments, such as "shut up Alexa" or "Alexa, you are stupid." Instead of continuing to disambiguate or preconfirm, or perform an action, the action confirmer component 285 may output an acknowledgement of the negative sentiment, such as an apology (e.g., "I am sorry" or "Sorry about that") and/or may end the dialogue session. The action confirmer component 285 may also use sentiment data to determine the user's negative sentiment expressed in the user input. An example dialogue illustrating this case is below:

User: set a timer for fifteen minutes
System: "You said fifteen, right?"
User: shut up
System: "Sorry about that"

Figure 7:
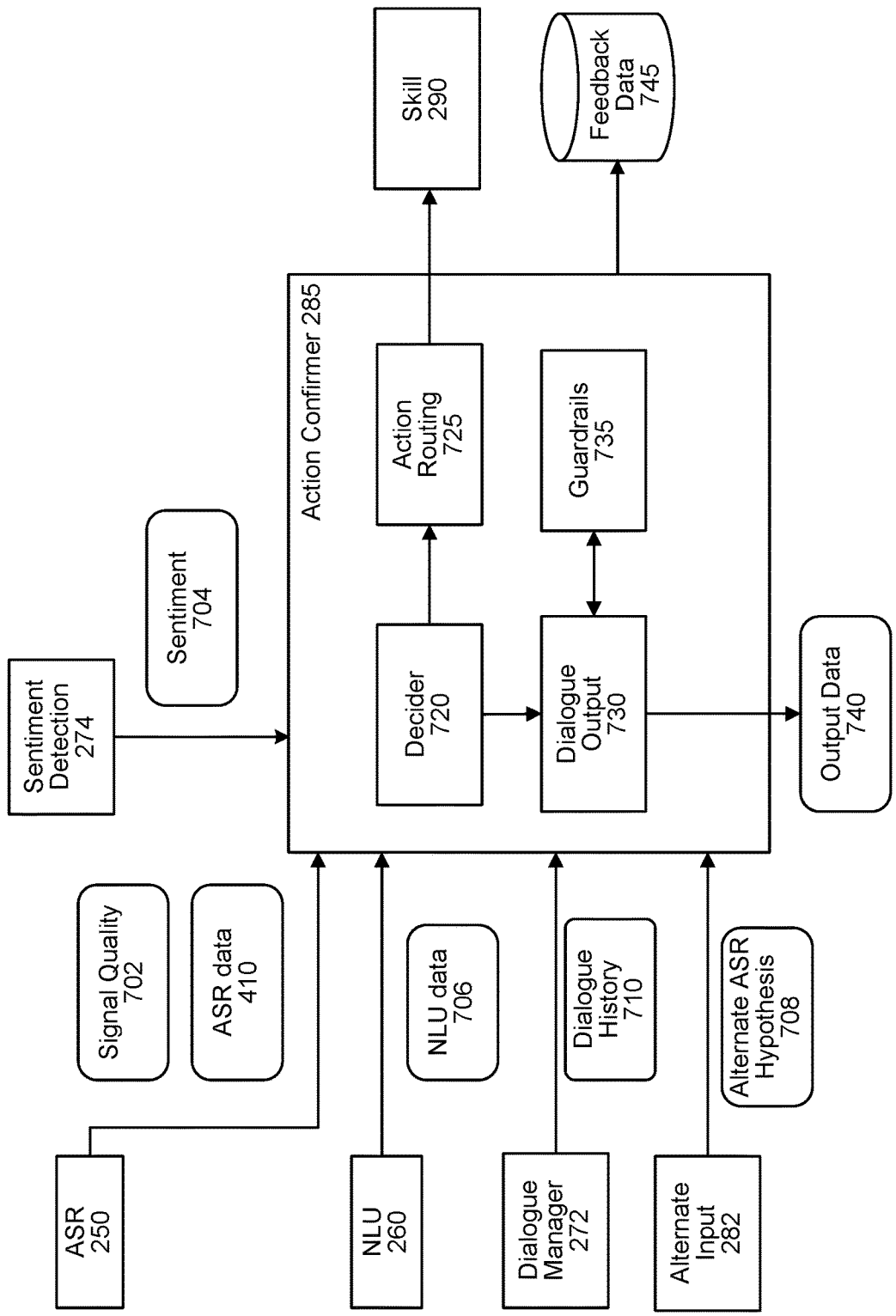
FIG. 7 is a conceptual diagram illustrating components of an action confirmer component according to embodiments of the present disclosure.

FIG. 7 is a conceptual diagram illustrating components of the action confirmer component 285 and the data that the action confirmer component 285 processes according to embodiments of the present disclosure. The action confirmer component 285 may include a decider component 720, an action routing component 725, a dialogue output component 730, and a guardrails component 735. The action confirmer component 285 may receive data from various other components of the system(s) 120, such as the ASR component 250, the NLU component 260, the dialogue manager component 272, the alternate input component 282, and the sentiment detection component 274, as illustrated in FIG. 7. In some embodiments, the action confirmer component 285 may also receive data from other components shown in FIGS. 2A, 2B, 3, 4, and 5, such as, for example, the shortlister 350, the recognizer 363, the skill 290, the post-NLU ranker 265, and others. As described below, the action confirmer component 285 may send data, such as intent, entity values, user data, etc., to a skill 290 to enable the skill to respond to the user input. Alternatively, the action confirmer component 285 may generate output data 740, which may be a dialogue response to the user input, and send the output data 740 to the orchestrator 230 for output to the user.

The signal quality data 702 may correspond to audio data 211 including the user input of the turn being processed by the action confirmer component 285. The signal quality data 702 may include data representing signal-to-noise ratio (SNR), a signal-to-interference ratio (SIR), signal-to-interference-plus-noise ratio (SINR), signal-to-echo ratio (SER), peak signal-to-noise ratio (PSNR; the ratio between the maximum possible value (power) of a signal and the power of distorting noise that affects the quality of its representation), and other values representing the signal quality/characteristics of the audio data 211.

The sentiment data 704 may indicate a sentiment category representing the user's sentiment when speaking. The sentiment categories may include happy, sad, angry, disappointed, and frustrated. The sentiment data 704 may indicate a confidence level (or score) for each sentiment category, for example, happy: low, sad: low, angry: medium, disappointed: low, frustrated: medium. The sentiment data 704 may include other data derived from the audio data 211. The sentiment data 704 may be based on the sentiment categories 655 and 675 determined by the sentiment detection component 274.

In some embodiments, the sentiment detection component 274 may determine the sentiment data using frame level features and utterance level features. The sentiment detection component 274 may extract frame level features from the audio data 211 or a portion of the audio data 211 that represents speech from the user. The audio data 211 may be inputted into an encoder to determine frame feature vector(s). One frame feature vector may represent audio frame level features for an audio frame of 10 ms to 20 ms of the audio data 211. The frame feature vector(s) may be derived by spectral analysis of the audio data 211. In some embodiments, the sentiment detection component 274 may determine utterance feature vector(s) representing utterance-level features of one or more utterances represented in the audio data 211. The utterance feature vector(s) may be determined by performing statistical calculations, delta calculation and other processing on the frame feature vector(s) for the audio frames corresponding to an utterance of interest. As such, the utterance feature vector(s) may be a feature matrix whose dimensions are based on the number of audio frames corresponding to the utterance of interest and the dimension of the corresponding frame feature vector(s). The utterance feature vector(s) may be a high-level function or other mathematical functions representing the utterance-level features.

In some embodiments, the sentiment detection component 274 may include one or more trained models (e.g., machine learning models). The trained model may process the frame feature vector(s) to determine one or more score(s) indicating a sentiment category corresponding to the audio data 211. In another embodiment, the trained model may process the utterance-level feature vectors to determine the one or more scores. The trained model may be trained, using a training dataset, to process audio frame features and/or utterance level features to determine a sentiment category for audio data. In an example embodiment, the trained model may predict one of six sentiment categories, including but not limited to, happy, sad, neutral, frustration, anger, and disappointed. In another embodiment, the sentiment categories may be broad such as positive, neutral, and negative or may be more precise such as angry, happy, frustrated, agitated, disappointed, distressed, surprised, disgust, or the like. The trained model may be trained to output a score for each sentiment category or a confidence level for each sentiment category, for example, "happy: medium, sad: low, angry: low, disappointed: low, frustrated: low." Thus the sentiment data 704 may be a data vector. In an example embodiment, the trained model may be a neural network machine learning model (recurrent neural network, deep learning neural network, a convolutional neural network, etc.), a statistical model, a probabilistic model, or another type of model.

In some embodiments, the frame feature vector(s) processed by the sentiment detection component 274 may represent audio frame level features extracted for a window of 25 ms of audio, where the window slides or moves in increments of 10 ms to extract features represented by the next frame feature vector. In other embodiments, one frame feature vector may represent features corresponding to an individual word in the utterance. The values in the feature vectors may indicate acoustic speech attributes such as accent, pitch, intonation, tone, stress, rhythm, speed, etc.

In some embodiments, the sentiment detection component 274 may use reference audio data corresponding to the user when the user is exhibiting a neutral sentiment/neutral emotional state, and may process the audio data 211 of the current user input with respect to the reference audio data, to determine a sentiment category corresponding to the audio data 211. This enables the sentiment detection component 274 to take into account a user's particular manner of speaking when determining the user's sentiment when speaking the user input.

In determining that the user is frustrated, the system(s) 120 in some embodiments may determine that the user is exhibiting frustration, agitation, disappointment, anger or other similar sentiments. The system(s) 120 may process acoustic characteristics of the audio data 211 to determine the sentiment data.

The action confirmer component 285 may also determine that the user is frustrated based on the user interrupting the system performing an action and/or the user canceling the request/performance of the action. For example, the system may be outputting synthesized speech: "The weather in Boston is . . . " and the user may interrupt by saying "stop", "cancel" or by repeating the previous user input "What is weather in Boston?", without letting the system complete the output of the weather information for Boston. The action confirmer component 285 may determine that the user interrupted or canceled the system's response based on the dialogue history data 710.

The ASR data 410 may include one or more ASR hypotheses and corresponding ASR confidence scores determined by the ASR component 250. Using the ASR data 410 the action confirmer component 285 may determine how certain the SLU system(s) 120 is about what the user said. The ASR data 410 may be provided to the action confirmer component 285 by the ASR component 250 directly or via the orchestrator 230. The ASR data 410 may include a ASR N-best list including a ranked list of ASR hypotheses corresponding to the user input of the current turn being processed.

The NLU data 706 may include one or more NLU hypotheses and corresponding NLU confidence scores determined by the NLU component 260. Using the NLU data 706 the action confirmer component 285 may determine how certain the SLU system(s) 120 is about the user's intent. The NLU data 706 may be provided to the action confirmer component 285 by the NLU component 260 directly or via the orchestrator 230. The NLU data 706 may include a NLU N-best list including a ranked list of NLU hypotheses corresponding to the user input of the current turn being processed.

The dialogue history data 710 may include data representing the user input(s) of previous turn(s) in the dialogue session and data representing the system-generated response to the user input in the previous turn(s). The dialogue history data 710 may include dialogue state data indicating the intent, the entity values, the slot values and the domain determined/selected to correspond to the user input. The dialogue history data 710 may also include a skill 290 selected to respond to the user input. The dialogue history data 710 may also include the ASR hypothesis and corresponding ASR confidence score and the NLU hypothesis and the corresponding NLU confidence score that were used to respond to the user input. The dialogue history data 710 may also include the ASR N-best list and the NLU N-best list for the user input(s) of the previous turn(s) of the dialogue session.

The action confirmer component 285 may use the dialogue history data 710 to determine that the current user input being processed is a repeat of a previous user input in the dialogue session. The previous user input may be the immediately previous user input or maybe any previous user input during the dialogue session. For example, a user input during a first turn of the dialogue session may be: "play XYZ movie", a user input during a second turn of the dialogue session may be: "stop", and a user input during a third turn of the dialogue session may be: "play XYZ movie." In this case, the action confirmer component 285 determines that the user input for the third turn is a repeat of the user input for the first turn. In some embodiments, a user input may be considered a repeat of a previous user input if the current user input was provided no more than a certain number of turns as the previous user input. For example, a user input may be considered a repeat of the previous user input if the current user input was provided within five turns of the previous user input. In other embodiments, the user input may be considered a repeat of a previous user input if it is was provided in the turn immediately after the turn of the previous user input.

The action confirmer component 285 may determine that the current user input is a repeat of a previous user input based on semantic similarities of the two user inputs. The current user input may be semantically similar to a previous user input, that is, the two user inputs may have the same or similar semantic meaning/representation. The user inputs may be considered to be semantically similar based on the meaning of the words in the user inputs being similar, rather than the form of the user input. For example, a user input "Alexa, turn on the TV" may be semantically similar to the user input "Alexa, start my TV." The semantic similarity between user inputs may be determined using word/utterance embeddings corresponding to the user input, and comparing the utterance embeddings to determine whether the two user inputs are semantically similar. The semantic similarity of two user inputs may be determined using the NLU data generated by the NLU component 260, where the NLU data includes an intent, one or more slot values, and/or one or more entity values corresponding to the user inputs. The action confirmer component 285 may determine that the user inputs are semantically similar based on a comparison of the intent, slot values and/or entity values. In some cases, the action confirmer component 285 may determine that the user inputs are semantically similar based on user profile data including user preferences, user settings, user-provided names/phrases for certain objects, past user interactions, etc. For example, a user input "turn on the bedroom TV" may be semantically similar to "turn on the TV."

The action confirmer component 285 may determine whether a current user input is a repeat of a previous user input using the dialogue history data 710. For example, the action confirmer component 285 may compare the text data of the ASR hypothesis selected to respond to the previous user input with the text data of the ASR hypothesis of the current user input to determine that the previous user input is the same or similar to the current user input.

In some embodiments, the action confirmer component 285 may determine that a current user input is a repeat of a previous user input based on the NLU hypothesis selected to respond to the previous user input with the NLU hypothesis of the current user input. In some cases, the user may not repeat the previous user input in the exact manner, and may rephrase the previous user input. In such cases, the intent, entity values, slot values and/or domain corresponding to the previous user input and the current user input may be the same, and the action confirmer component 285 may make that determination using the NLU data corresponding to the previous user input included in the dialogue history data 710. The action confirmer component 285 may determine that the current user input is a repeat of a previous user input based on the intent, the domain, and/or entity/slot values corresponding to the user inputs being the same or substantially similar. For example, a current user input of "play my playlist" may be determined to be a repeat of the previous user input "play the playlist."

The alternate input component 282 may be configured to determine an alternative representation of an utterance/user input that is a rewrite or rephrase of the user input and that results in the desired response to the user input. In some embodiments, the alternate input component 282 may determine an alternative representation for a user input using user-specific data. In some embodiments, the alternate input component 282 may determine a ranked list of candidate alternative representations. In yet another embodiment, the alternative input component 282 may determine whether a user input will cause friction.

In some embodiments, the alternate input component 282 may include one or more trained models (e.g., machine-learning models) that may be configured to process a user input to determine one or more alternative representations corresponding to the user input. In some embodiments, the alternate input component 282 may use rephrase utterance pairs to determine an alternative representation of the user input. The alternate input component 282 may process historical dialogue session data (corresponding to multiple different users) to determine if one or more utterances in the dialogue session are a rephrase of an initial utterance. As described herein, two or more utterances are considered to be part of the same dialogue session based on the time elapsed between the utterances. The alternate input component 282 may determine the utterance rephrase pairs based on the domain, the intent, the slot type and/slot value being similar or the same between two utterances. The alternate input component 282 may also determine the utterance rephrase pairs based on the user indicating that the utterance is a rephrase of a prior user input. The alternate input component 282 may also determine the utterance rephrase pairs based on the rephrased utterance resulting in the user's desired response. In some embodiments, the alternate input component 282 may also use the NLU hypothesis corresponding to the rephrased utterance. In non-limiting examples, the alternate input component 282 may process the following dialogue session data:

Utterance (turn 1): play lonely eyes old time road
NLU hypothesis: Domain <Music>|Intent <PlayMusic>|SongName <lonely eyes old time road>
Utterance (turn 2): play luna's x old time road
NLU hypothesis: Domain <Music>|Intent <PlayMusic>|ArtistName <luna's x>|SongName <old time road>
Utterance (turn 3): play launa's x old time road
NLU hypothesis: Domain <Music>|Intent <PlayMusic>|ArtistName <launa's x>|SongName <old time road>
Utterance (turn 4): play lil nas x old town road
NLU hypothesis: Domain <Music>|Intent <PlayMusic>|ArtistName <lil nas x>|SongName <old time road>

In the above example, the alternate input component 282 may determine that the utterance at turn 4 is the corrected/alternative representation of the other utterances since the turn 4 utterance results in the user's desired response. The alternate input component 282 may use text data representing the following utterance pairs: {play lonely eyes old time road, play lil nas x old town road}, {play luna's x old time road, play lil nas x old town road}, {play launa's x old time road, play lil nas x old town road}. Using stored rephrase utterance pairs, in some embodiments, the alternate input component 282 may determine an alternative representation of the current user input by comparing the current user input with the stored rephrase utterance pairs. Example utterance rephrase pairs may include {"play ambient mean", "play envy me"} where the rephrase corrects the ASR error, {"play blues radio news", "play blue news radio"} where the rephrase rearranges the words for better clarity, and {"play relax music", "play relaxing music from my playlist} where the rephrase specifies details for the user input.

In some embodiments, the alternate input component 282 may use indexed utterance rephrase pairs, for example, a k-Nearest Neighbor (kNN) index of alternative representation candidates. The indexed alternative representation candidates may be from a set of predefined rephrase pairs selected from historical dialogue data. The alternate input component 282 may use an index of both the original utterance and the rephrased utterance for a rephrase pair. In one embodiment, the alternate input component 282 may determine an utterance-level embedding for a user input (by processing text data corresponding to the user input using an encoder) and determine top-k relevant rephrases using the kNN index in the projected space. The alternate input component 282 may select one alternative representation for the user input and may store it as the alternative ASR hypothesis data 708.

In some embodiments, the alternate input component 282 may use a weighted directed graph that models historical utterances and NLU hypotheses data. The nodes in the graph may represent the utterances and corresponding NLU hypotheses and the edge weights may be historical transition probabilities. Given an input utterance, the graph's API may be capable of returning a sink node such that the path from the input utterance to the sink node is most probable, and the utterance at the sink node is considered as the alternative representation of the user input. The number of utterances included in the graph may be limited, and may not be capable of determining an alternative representation for any given/arbitrary utterance if it is not included in the graph. The alternate input component 282 may leverage the graph and an utterance-level embedding (generated by processing text data corresponding to the user input using an encoder) to determine an alternative representation based on semantic similarities between the utterances represented in the graph and the embedded user input. The determined alternative representation may be stored as the alternative ASR hypothesis data 708.

In some embodiments, the alternate input component 282 may use user-specific utterance rephrase pairs to determine an alternative representation of a user input. For example, the alternate input component 282 may use historical dialogue session data corresponding to the particular user to determine the utterance rephrase pairs as described above. The user-specific utterance rephrase pairs may be associated with the user profile identifier in the profile storage 270. For example, a user-specific utterance rephrase pair may include text data representing the following utterance rephrase pair {what is the weather in Boston, what is the weather in Austin}. The example utterance rephrase pair may have been spoken by a first user associated with a first user profile corresponding to a first group of user profiles. The user-specific utterance rephrase pairs may take into account user-specific characteristics, such as the user's accent, etc. The first group of user profiles may correspond to user profiles associated with a particular location/region (e.g., users living in a particular region having a particular accent or particular way of speaking/vocabulary), a particular proficiency in interacting with the natural language processing system, a particular background, a particular preference/interest, particular demographic information, etc.

In some embodiments, the alternate input component 282 may process a user input to determine whether or not the user input will cause friction (will result in an undesired response or an error). The alternate input component 282 may use past user inputs received by the system(s) 120, and a corresponding indication of whether processing of the past user input resulted in friction. For example, the alternate input component 282 may use text data representing the user input and a Boolean value or a flag indicating whether the input caused friction. Example data may be {"What is the weather in Boston?", 1/yes/error}, {"play baby shark", 0/no/success}, etc. The alternate input component 282 may determine a likelihood of the user input causing friction, and may send data representing the likelihood to the action confirmer component 285.

In some embodiments, the alternate input component 282 may use a probabilistic graph mapping multiple past user inputs and their corresponding probability of causing an error/undesired response. The alternate input component 282 may determine utterance-level embedding (by processing text data representing the user input using an encoder), and may determine a likelihood of the user input causing friction based the semantic similarity between the user input and the past user inputs represented in the probabilistic graph.

If the alternate input component 282 determines that the user input will cause friction based on the determined likelihood satisfying a threshold/condition, then the alternate input component 282 may determine an alternative representation of the user input as described above using utterance rephrase pairs. If the alternate input component 282 determines that the input utterance will not cause friction (e.g., result in the desired response) based on the determined likelihood satisfying another threshold/condition, then the alternate input component 282 may not determine an alternative representation of the user input.

In some cases, the alternate input component 282 may not determine or is unable to determine an alternative representation of the user input. In that case, the alternative ASR hypothesis data 708 may be null. Otherwise, the alternative ASR hypothesis data 708 may include text data representing the alternative representation of the user input and/or NLU data (intent, slot, domain, entity, etc.) corresponding to the alternative representation of the user input.

As described above, the ASR component 250 may process audio data representing an utterance from a user to determine an N-best list of ASR hypotheses corresponding to the text data that may represent the utterance. The ASR component also generates confidence scores corresponding to each ASR hypothesis. When there is confusion with respect to the ASR processing, the system may have low confidence in determining what the user said, which may be evident in low ASR confidence scores.

As described above, the NLU component 260 may process one ASR hypothesis (e.g., the ASR hypothesis with the highest confidence score, the ASR 1-best hypothesis, etc.) to generate NLU data including intent data, slot data and a confidence score. In some embodiments, for disambiguation purposes the NLU component 260 may be configured to process two ASR hypotheses. For example, the NLU component 260 may process the ASR 1-best hypothesis to generate an interpretation and corresponding NLU data. The NLU component 260 may also process another ASR hypothesis, for example, the 2-best ASR hypothesis or another hypothesis sent to the NLU component 260, to generate a second interpretation and corresponding NLU data. The second ASR hypothesis may represent a hypothesis that the SLU system(s) 120 determines to be ambiguous at least because of the confidence score corresponding to the 1-best and the second ASR hypothesis.

The decider component 720 may be configured to process the various data described above and received by the action confirmer component 285. The decider component 720 may determine whether the SLU processing data for the user input indicates an ambiguity(ies), such that the system should output a certain dialogue, instead of performing an action, in response to the user input. If the decider component 720 determines that there is no ambiguity, then the decider component 720 may send various data to the action routing component 725. The action routing component 725 may determine which skill 290 to invoke to respond to the user input based on the data provided by the decider component 720. The action routing component 720 may determine the skill 290 to invoke based on the ASR data 410, NLU data 706, alternate ASR hypothesis data 708, dialogue history data 710, and other data.

The decider component 720 may select from a variety of responses/actions to take based on processing of the various signals/data determined during SLU processing of the user input. The variety of responses/actions that the decider component 720 may choose from include confirming an alternative action with the user using a dialogue, confirming an action corresponding to the best NLU hypothesis, confirming an ASR hypothesis using a dialogue, asking the user to repeat the user input, routing the best NLU hypothesis to the appropriate skill, and routing an alternative NLU hypothesis/action to the appropriate skill.

In some embodiments, the decider component 720 may process the sentiment data 704 corresponding to the user input and determine that the user exhibited frustration while speaking or otherwise providing the user input. The user may exhibit frustration immediately before speaking, while speaking, or after speaking the user input. The decider component 720 may also process the dialogue history data 710 to determine that the user input is a repeat of a previous user input of the dialogue session. Based on these determinations, the decider component 720 may send data to the dialogue output component 730.

The dialogue output component 730 may be configured to determine which dialogue to output in response to the user input. The dialogue output component 730 may determine the dialogue to output based on the ASR data 410, the NLU data 706, the alternate ASR hypothesis data 708, the dialogue history data 710, and other data. For example, the dialogue output component 730 may determine that there are no alternate representations of the user input using the alternate ASR hypothesis data 708, and may determine to output a confirmation dialogue to confirm performance of the previous action (the action corresponding to the previous user input that the current user input is a repeat of).

In another example, the dialogue output component 730 may determine, using the ASR data 410, that the other ASR hypotheses corresponding to the user input do not have confidence scores that meet a condition (e.g., exceed a threshold level). The dialogue output component 730 may determine that the best-ASR hypothesis corresponding to the user input meets a condition (e.g., exceeds a threshold level), indicating that there is no alternative ASR hypothesis determined by the ASR component 250 with a certain level of confidence that could potentially correspond to what the user said. In this case, the dialogue output component 730 may determine to output a confirmation dialogue to confirm performance of the previous action (the action corresponding to the previous user input that the current user input is a repeat of).

In another example, the dialogue output component 730 may determine, using the NLU data 706, that there is no other NLU hypothesis with a certain confidence level that may correspond to the user's intent. The dialogue output component 730 may make this determination based on the NLU confidence scores corresponding to the NLU hypotheses other than the best-NLU hypothesis not satisfying a condition (e.g., not exceeding a threshold value). The dialogue output component 730 may determine that the best-NLU hypothesis satisfies a condition (e.g., exceeds a threshold value). In this case, the dialogue output component 730 may determine to output a confirmation dialogue to confirm performance of the previous action (the action corresponding to the previous user input that the current user input is a repeat of).

In another example, the dialogue output component 730 may determine, using the ASR data 410, that another ASR hypothesis of the ASR N-best list may potentially represent what the user said based on the corresponding ASR confidence score satisfying a condition (e.g., exceeding a threshold value). In this case, the dialogue output component 730 may determine to output a disambiguation dialogue to confirm performance of an action corresponding to the second-best ASR hypothesis. In some embodiments, the disambiguation dialogue may present two or more actions to the user to choose from, where the first action may be the previously performed action and the second action may correspond to the second-best ASR hypothesis.

In another example, the dialogue output component 730 may determine, using the alternate ASR hypothesis data 708, that the alternate input component 282 determined another representation of the user input, as described above. In this case, the dialogue output component 730 may determine to output a disambiguation dialogue to confirm performance of the action corresponding to the alternate ASR hypothesis/representation of the user input. In some embodiments, the disambiguation dialogue may present two or more actions to the user to choose from, where the first action may be the previously performed action and the second action may correspond to the alternate ASR hypothesis.

In yet another example, the dialogue output component 730 may determine, using the NLU data 706, that another NLU hypothesis of the NLU N-best list may potentially represent the user's intent based on the corresponding NLU confidence score satisfying a condition (e.g., exceeding a threshold value). In this case, the dialogue output component 730 may determine to output a disambiguation dialogue to confirm performance of an action corresponding to the second-best NLU hypothesis. In some embodiments, the disambiguation dialogue may present two or more actions to the user to choose from, where the first action may be the previously performed action and the second action may correspond to the second-best NLU hypothesis.

In some embodiments, the decider component 720 may process the signal quality data 702 to determine that the audio data 211 corresponding to the user input has certain characteristics that can cause difficulties for (at least) the ASR component 250 in determining what the user said. The decider component 720 may determine that the signal quality data 702 satisfies certain conditions, for example, the SNR value exceeds a threshold value, falls below a certain threshold, etc. In this case, the decider component 720 may send data to the dialogue output component 730 to output a dialogue instead of performing an action.

The dialogue output component 730 may process the signal quality data 702 to determine which dialogue to output. For example, the dialogue output component 730 may determine, using the signal quality data 702, that the user is too far from the microphone, and may output a dialogue requesting the user to move closer to the microphone and repeat the user input. In another example, the dialogue output component 730 may determine, using the signal quality data 702, that a lot of background noise was captured in the audio data 211, and may output a dialogue requesting the user to repeat the user input louder. In another example, the dialogue output component 730 may determine, using the signal quality data, 702, that the user is speaking softly, and may output a dialogue requesting the user to repeat the user input louder.

In some embodiments, the decider component 720 may determine, using the NLU data 706 or other data, that the user input includes a negative sentiment intent. For example, the NLU component 260 may determine based on the content of the user input that the user input corresponds to a negative sentiment intent. For example, the user input "shut up", "you are stupid", "I hate you", or user inputs with expletive language indicating a negative sentiment towards the system, may be associated with the negative sentiment intent. In this case, the decider component 720 may send data to the dialogue output component 730. Based on the negative sentiment intent, the dialogue output component 730 may response with a dialogue apologizing to the user, such as, "I am sorry" or "sorry about that." Instead of outputting an apologizing dialogue or in addition to the apologizing dialogue, the action confirmer component 285 may also end the dialogue session, for example, by sending a message to the dialogue manager 272 to end the dialogue session. Ending the dialogue session causes subsequently received user inputs from the user to start a new dialogue and to be associated with another dialogue session identifier.

In addition to the negative sentiment intent, the action confirmer component 285 may also determine that the sentiment data 702 indicates that the user is frustrated, angry, agitated, disappointed, or exhibiting other similar sentiments.

In some embodiments, the decider component 720 may include a rule-based engine which may implement a policy hierarchy to help the decider component 720 determine how to respond to a user input when certain data/signals are present. In other embodiments, the decider component 720 may include one or more machine-learning models that processes the various data described above to determine whether the action routing component 725 should be invoked in response to the user input or the dialogue output component 730 should be invoked.

In some embodiments, the dialogue output component 730 may include a rule-based engine which may help the dialogue output component 730 select a dialogue to respond to a user input when certain data/signals are present. In other embodiments, the dialogue output component 730 may include one or more machine-learning models that processes the various data described above to select a dialogue to respond to the user input.

The guardrails component 735 may be configured to enforce certain rules or checks based on system policies and/or user-related data. The guardrails component 735 may limit the number of times the action confirmer component 285 outputs a dialogue instead of performing an action in response to a user input. For example, the guardrails component 735 may limit dialogue output to a certain percentage (e.g., 50%) of incoming user inputs during a time period. In another example, the guardrails component 735 may limit dialogue output to a certain percentage of the user inputs that the action confirmer component 285 determines should involve responding with a dialogue instead of performing an action. The guardrails component 735 may process user profile data (e.g., user preferences, past user interactions, past dialogue sessions, prior turns of the current dialogue session, etc.) to determine that the user for the current dialogue session does not want to receive a dialogue and would rather have the system perform an action responsive to the user input. For example, the user may have set preferences indicating that in certain situations/contexts (e.g., do-not-disturb mode, during evening/night hours, etc.) the system should not engage in a dialogue (such as confirmation or disambiguation) and instead should perform the requested action. In another example, the guardrails component 735 may limit the number of times the action confirmer component 285 output a dialogue instead of performing an action for a particular user based on past dialogue sessions. In yet another example, the guardrails component 735 may limit the number of times a dialogue is outputted during a particular dialogue session. In a further example, the guardrails component 735 may indicate to the dialogue component 730 to not present an alternative or a particular dialogue based on negative feedback received from the user in the past when the alternative or similar alternative, the dialogue or similar dialogue was presented to the user.

In some embodiments, the guardrails component 735 may perform an additional check to ensure that outputting a dialogue requesting the user to provide additional information (e.g., selecting between two or more actions, confirming an action, repeating the user input, etc.) is necessary/warranted by the SLU processing data indicating some ambiguity. In some cases, the ambiguity can be resolved using information related to the user input, contextual data, user profile data or other data, and the guardrails component 735 may determine whether the ambiguity can be resolved in this manner. If it can, then the guardrails component 735 may prevent the action confirmer component 285 from outputting a dialogue, and rather cause it to perform an action responsive to the user input. In a non-limiting example, during a past dialogue session, the system may have already outputted a disambiguation dialogue to the user in response to a first user input, and the user may have already responded with which action the user wants the system to perform. In the current dialogue session, the user may provide the same user input as the first user input, and the system processing may lead to the action confirmer component 285 to determine that a disambiguation dialogue is needed to clarify which action the user wants performed. The guardrails component 735, in this case, may determine that the user had previously responded to the same disambiguation dialogue and may inform the decider component 720 to use the user's past response to perform an action responsive to the user input, instead of outputting the disambiguation dialogue. In this manner, the guardrails component 735 can prevent repeating questions/dialogues to the user when the user has already provided the information in the past.

The output data 740 may include text data based on the dialogue selected by the dialogue output component 730. The output data 740 may include structured data that may be used by a natural language generation (NLG) component to generate a natural language output. The output data 740 may include a dialogue template that the system(s) 120 may use to respond to the user input. For example, for a disambiguation dialogue, the output data 740 may be "I may have misunderstood you. Did you mean <action corresponding to second-best NLU>?" In another example, for a confirmation dialogue, the output data 740 may be "Do you want me to <previously performed action>?" In another example, the output data 740 may be "I couldn't hear you, can you <"speak louder" or "move closer">" representing a system request based at least in part on processing the signal quality data 702. In yet another example, the output data 740 may be "ok" or <acknowledge negative feedback> representing an acknowledgement of the negative sentiment intent/negative feedback.

The NLG component may transform structured data/machine code to a natural language representation of the output data 740. The NLG component may determine output text data representing a natural language representation of the output data 740, and send it to the orchestrator 230. The orchestrator 230 may determine to output synthesized speech, and may send the output text data to the TTS component 280. The TTS component 280, as described above in relation to FIG. 2A, may determine output audio data representing synthesized speech corresponding to the output text data, and the output audio data may be the system-generated response to the user input and may be associated with the dialogue session identifier for the dialogue session.

In another example embodiment, the ambiguity may be caused by an out-of-vocabulary word that the ASR component 250 may not be configured to recognize. The ASR component 250 may generate a low ASR confidence score corresponding to the out-of-vocabulary word, and the action confirmer component 285 may flag the ASR/NLU hypothesis to indicate that it includes an out-of-vocabulary word. In such cases, the action confirmer component 285 may determine to request confirmation from the user with respect to the out-of-vocabulary word using a confirmation dialogue. If the user confirms, then the out-of-vocabulary word may be used to retrain the ASR model(s) to recognize the out-of-vocabulary word. In some cases, the out-of-vocabulary word may be used to retrain a user-specific model, if the out-of-vocabulary word is not widely used by other users.

The action confirmer component 285 may store data in a feedback data storage 745 relating to processing of the dialogue sessions. The feedback data storage 745 may include audio data corresponding to one or more user inputs during the dialogue session, one or more ASR hypotheses (along with ASR scores) corresponding to each of the user inputs, one or more NLU hypotheses (along with NLU scores) corresponding to each of the user inputs, the system-generated responses/actions (e.g., routing to a skill or outputting a confirmation or disambiguation dialogue), sentiment data corresponding to the user inputs, signal quality data corresponding to the user inputs, alternative inputs (if any) determined by the system, guardrail data (if any) used by the action confirmer component 285 in determining an action or dialogue, and other data analyzed by the action confirmer component 285 to make a determination on what the system response should be to the user input.

The system(s) 120 may be configured to process data stored in the feedback data storage 745 to determine how the components in the system(s) 120 can learn or update their processes and machine-learning models. In example embodiment, the system(s) 120 may include a learning component (e.g., a trained component or a trained machine learning model) configured to process the data in the feedback data storage 745 to determine in which manner the system can learn from the data. The learning component may identify a confidence score associated with the system generated response to a user input, and if the confidence score exceeds a threshold, then the learning component may determine that the dialogue session data can be used to train/retrain/update one or more components of the SLU system(s) 120, one or more machine learning models, or to generate one or more new machine learning models.

The learning component may also process the dialogue session data to determine whether the friction (error/ambiguity) corresponding to the dialogue session is one that is encountered by multiple users or is specifically encountered by the user of the particular dialogue session. The learning component may determine that the friction is encountered by multiple users by evaluating historical dialogue session data corresponding to multiple different users, determine the frequency of this particular friction occurring and the number of users that had such interactions with the system(s) 120. If the frequency and/or the number of users satisfy a threshold, then the learning component may determine that the ambiguity is encountered by multiple users. If the frequency and/or the number of users does not satisfy a threshold, then the learning component may determine that the friction is user-specific.

If the friction is user-specific, then the learning component may send the dialogue session data to a model builder component, which may be configured to process the dialogue session data along with the SLU processing data, to generate one or more user-specific machine-learning models that incorporates data specific to the user. The model data corresponding to the user-specific models may be stored in the profile storage 270 and associated with the user profile identifier corresponding to the dialogue session identifier.

The data in the profile storage 270 may be used by the ASR component 250 in conjunction with the ASR model(s) data 252, the NLU component 260 in conjunction with the data of the NLU storage 373 and the entity library 382, and/or other components shown in FIGS. 2A, 2B, 3, 4, and 5 to process a user input received from a particular user. The user-specific model(s) may employ techniques like n-gram boosting to emphasize certain words or features during ASR processing. The user-specific model(s) may also be FST(s) for specific slot values, words, and other data that may be used with the ASR model(s) to determine text data corresponding to user input more accurately taking into consideration features specific to the user.

If the friction is encountered by multiple users, then the learning component may send the dialogue session data to a model builder component, which may be configured to process the dialogue session data, along with the SLU processing data, to retrain/update one or more ASR machine-learning models (e.g., acoustic model(s) 253, language model(s) 254, FST(s) 255), NLU components (e.g., shortlister 350, recognizer 363, etc.) post-NLU ranker components and other SLU models. The model data corresponding to the retrained or updated ASR models may be stored in the ASR model(s) storage 252. The data in the ASR model(s) storage 252 may be used by the ASR component 250 to process any user input received by the system(s) 120. While the user-specific model(s) may be used by the ASR component 250 to process user input from one or more specific users (determined using the corresponding user profile).

The learning component may determine that the friction is experienced by a certain group of users based on a similarity in demographic information, user profile information, device type used, etc. The learning component may determine that the friction is experienced at a household level, for example, by multiple users within a household. The learning component may, accordingly, associate a user-specific model with multiple users based the group of users or the household of users experiencing the particular friction.

Figure 8:
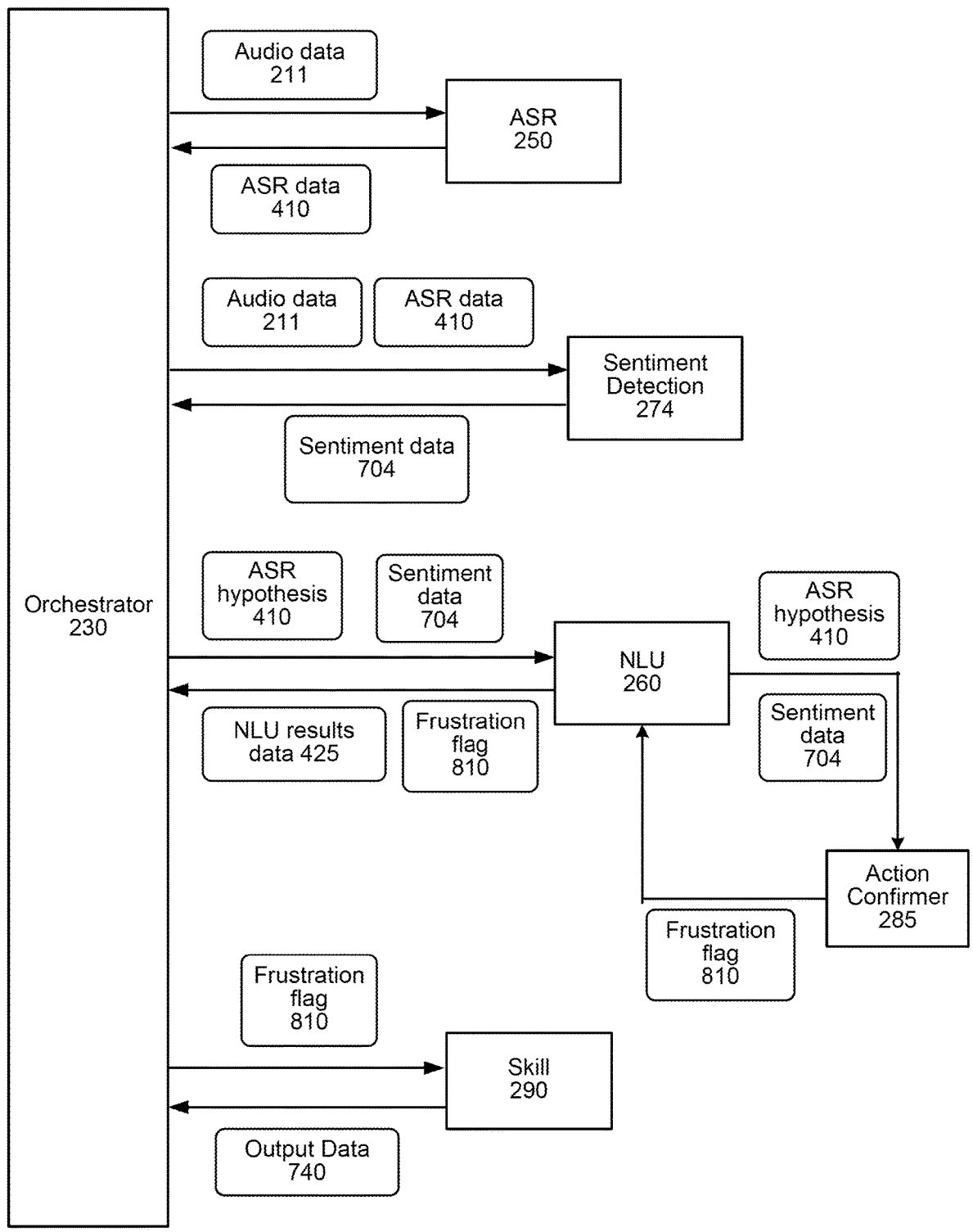
FIG. 8 is a conceptual diagram illustrating data flow between various components according to embodiments of the present disclosure.

FIG. 8 is a conceptual diagram illustrating another example system architecture that may be used to respond to a frustrated user. The system shown in FIG. 8 may be used instead of or in addition to the system shown in FIG. 7. As illustrated in FIG. 8, the orchestrator 230 may send audio data 211 to the ASR component 250 to determine ASR data 410 corresponding to the audio data 211. The ASR data 410 may include an N-best list of ASR hypotheses and corresponding ASR confidence scores. The orchestrator 230 may send the audio data 211 and the ASR data 410 to the sentiment detection component 274 to determine a sentiment category/data 704 associated with the audio data 211 (as described in connection with FIG. 6 above). In some embodiments, the sentiment detection component 274 may determine the sentiment data 704 using acoustic characteristics (derived from the audio data 211) and lexical characteristics (derived from the ASR data 410). The lexical characteristics may be represented as the word feature vectors 630. When frustration is detected using acoustic characteristics of the user's speech and/or the lexical characteristics of what the user said, the sentiment data 704 may be indicate a frustration sentiment category.

The orchestrator 230 may send the ASR data 410 and the sentiment data 704 to the NLU component 260 to determine one or more NLU hypotheses/data corresponding to the ASR data 410. The NLU component 260 may send the ASR data 410 and the sentiment data 704 to the action confirmer component 285. In some cases, the NLU component 260 may also send one or more NLU hypotheses determined by the NLU component 260 to the action confirmer component 285. As described above, the action confirmer component 285 may determine how to respond to the user, in this particular case, when the user is frustrated and the utterances is a repeat of a previous utterance during the dialogue session.

The action confirmer component 285 may process the sentiment data 704 and may determine that the user is frustrated. The action confirmer component 285 may process the ASR data 410 and dialogue session data (not shown) to determine that the current user input is a repeat of a previous user input during the dialogue session. The action confirmer component 285 may also use the sentiment data/category associated with the previous user inputs during the dialogue session to determine which action should be taken. Based on the user exhibiting frustration during the current user input and/or previous user inputs, and based on the current user input being a repeat of a previous user input of the dialogue session, the action confirmer component 285 may determine a frustration flag 810 indicating that the user is frustrated. The action confirmer component 285 may send a frustration flag 810 to the NLU component 260. Based at least on processing of the sentiment data 704, if the action confirmer component 285 determines that the user is not frustrated, then action confirmer component 285 may not send the frustration flag 810 or the frustration flag 810 may be set to "false" or other negative values (e.g., "0", "no", etc.).

In some embodiments, the action confirmer component 285 may determine that the current user input is a repeat of a previous user input of the dialogue session by determining if the current user input is a rephrase of a previous user input based on comparing one or more NLU hypotheses corresponding to the previous user input and one or more NLU hypotheses corresponding to the current user input. If the intent, slot values, and/or entity values are the same for the previous user input and the current user input, then the action confirmer component 285 may determine that the current user input is a rephrase of the previous user input. For example, a previous user input may be "Play Harry Potter" and a current user input, which is a rephrase of the previous user input, may be "Play Harry Potter the movie." Another example of a previous user input may be "Play Harry Potter" and a current user input, which is a rephrase of the previous user input, may be "No, I want to read the book Harry Potter."

The NLU component 260 may send the NLU results data 425 and the frustration flag 810 to the orchestrator 230. Using the NLU results data 425 (and other components not shown in FIG. 8), the system may select a skill 290 to forward the user input to for further processing and responding to the user. The orchestrator 230 may send the frustration flag 810 to the skill 290 to indicate to the skill 290 that the user is frustrated, and the skill 290 may determine the output data 740 accordingly. As described above, the output data 740 may be a dialogue (instead of an action responsive to the user input) that confirms an action to be performed in response to the user input, confirms that the previously performed action is to be performed in response to the repeated used input, presents an alternative action to be performed in response to the user input, or presents two or more options for the user to select from that the system is to perform in response to the user input. The skill 290 may determine which dialogue to present to the user as described in relation to the dialogue output component 730.

Figure 9:
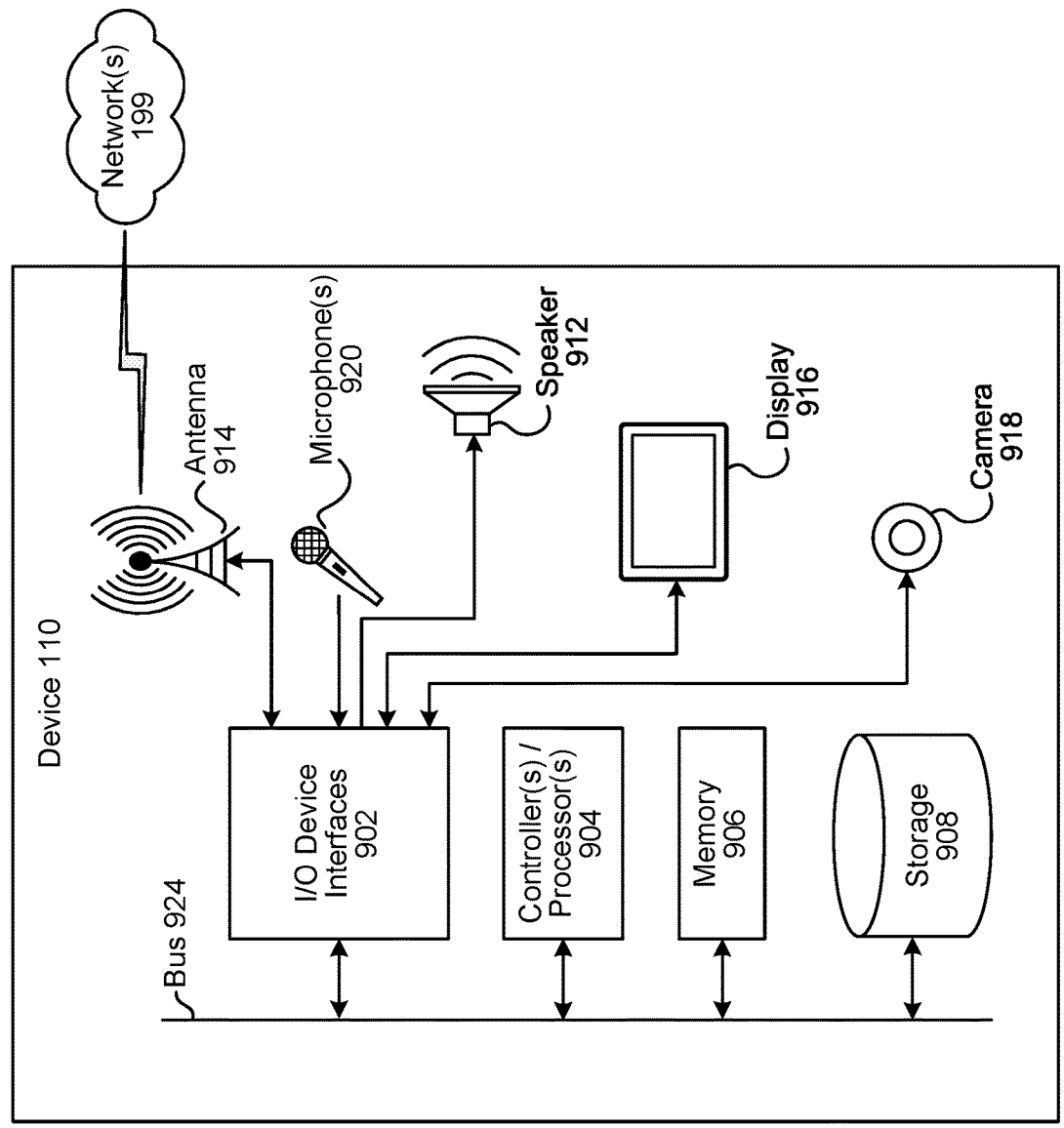
FIG. 9 is a block diagram conceptually illustrating example components of a device according to embodiments of the present disclosure.
Figure 10:
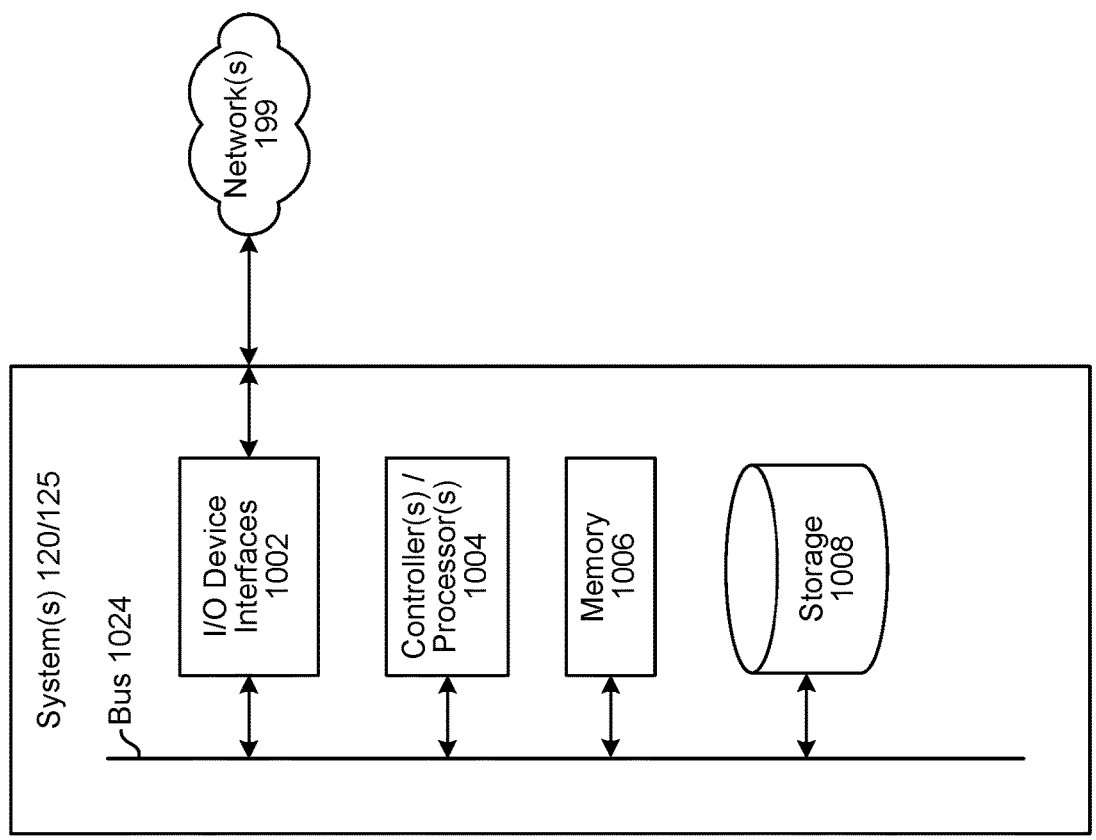
FIG. 10 is a block diagram conceptually illustrating example components of a server according to embodiments of the present disclosure.

FIG. 9 is a block diagram conceptually illustrating a device 110 that may be used with the system. FIG. 10 is a block diagram conceptually illustrating example components of a remote device, such as the system(s) 120, which may assist with ASR processing, NLU processing, etc., and the skill system(s) 125. A system (120/125) may include one or more servers. A "server" as used herein may refer to a server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system of the present disclosure, such as one or more systems 120 for performing ASR processing, one or more systems 120 for performing NLU processing, one or more skill systems 125 for performing actions responsive to user inputs, etc. In operation, each of these systems may include computer-readable and computer-executable instructions that reside on the respective device (120/125), as will be discussed further below.

Each of these devices (110/120/125) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120/125) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (902/1002).

Computer instructions for operating each device (110/120/125) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120/125) includes input/output device interfaces (902/1002). A variety of components may be connected through the input/output device interfaces (902/1002), as will be discussed further below. Additionally, each device (110/120/125) may include an address/data bus (924/1024) for conveying data among components of the respective device. Each component within a device (110/120/125) may also be directly connected to other components in addition to (or instead of) being connected to other components across the bus (924/1024).

Referring to FIG. 9, the device 110 may include input/output device interfaces 902 that connect to a variety of components such as an audio output component such as a speaker 912, a wired headset or a wireless headset (not illustrated), or other component capable of outputting audio. The device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 916 for displaying content. The device 110 may further include a camera 918.

Via antenna(s) 914, the input/output device interfaces 902 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device(s) 110, the system(s) 120, or the skill system(s) 125 may include their own dedicated processors, memory, and/or storage. Alternatively, one or more of the components of the device(s) 110, the system(s) 120, or the skill system(s) 125 may utilize the I/O interfaces (902/1002), processor(s) (904/1004), memory (906/1006), and/or storage (908/1008) of the device(s) 110 system(s) 120, or the skill system(s) 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 125, as described herein, are illustrative, and may be located as a stand-alone device or may be included, in whole or in part, as a component of a larger device or system.

Figure 11:
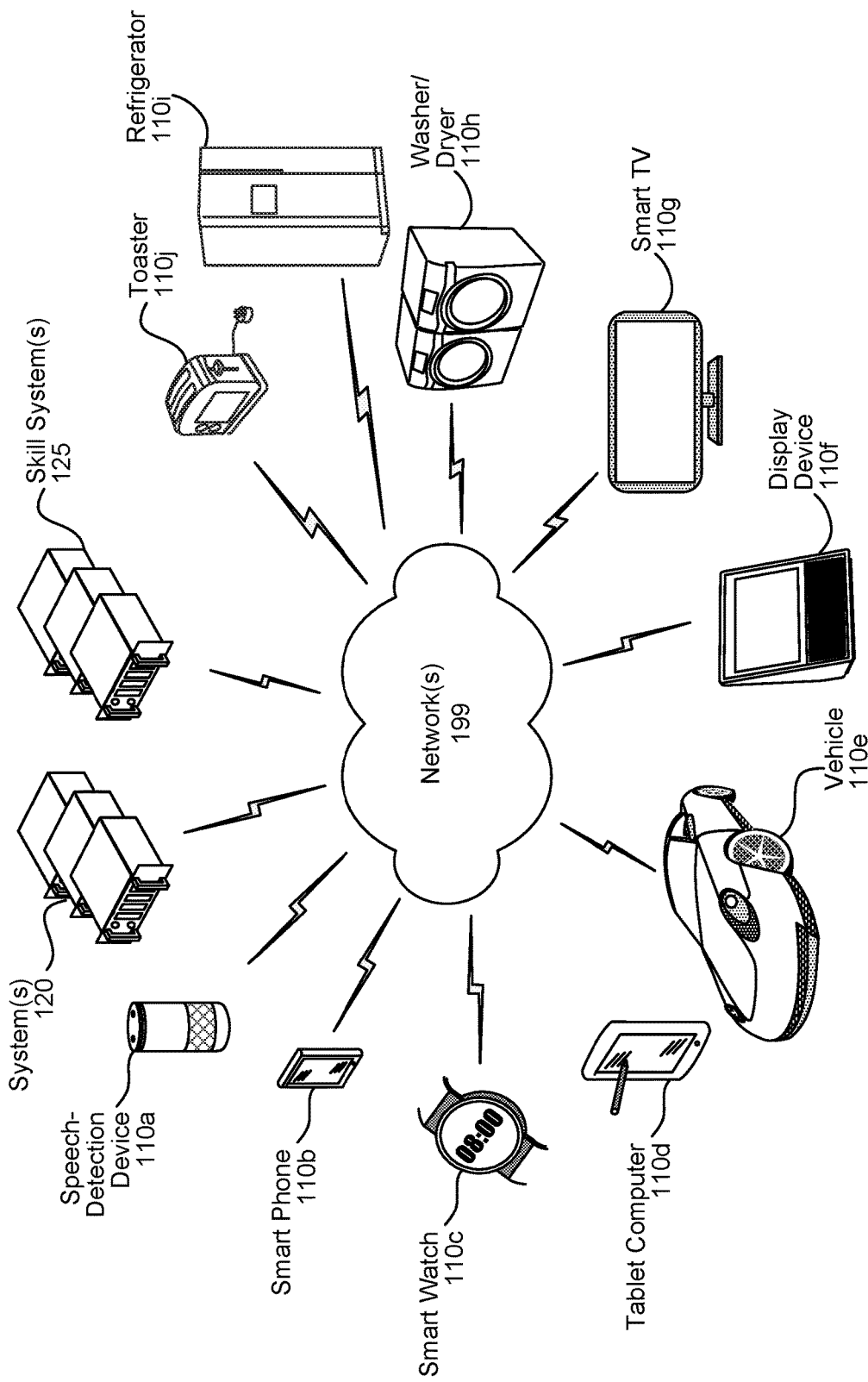
FIG. 11 illustrates an example of a computer network for use with the speech processing system.

As illustrated in FIG. 11, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110*i*, and/or a toaster 110*j* may be connected to the network(s) 199 through a wireless service provider, over a WiFi or cellular network connection, or the like. Other devices are included as network-connected support devices, such as the system(s) 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving first audio data representing a first utterance;
associating the first audio data with a first dialogue session identifier;
determining, using automatic speech recognition (ASR) processing, first ASR output data corresponding to the first audio data;
determining, using natural language understanding (NLU) processing, a first NLU hypothesis corresponding to the first ASR output data, the first NLU hypothesis associated with a first confidence score;
determining, using natural language understanding (NLU) processing, a second NLU hypothesis corresponding to the first ASR output data, the second NLU hypothesis associated with a second confidence score;
associating at least the first ASR output data, the first NLU hypothesis and the second NLU hypothesis with the first dialogue session identifier;
performing a first action in response to the first utterance, the first action corresponding to an intent included in the first NLU hypothesis;
receiving second audio data representing a second utterance;
associating the second audio data with the first dialogue session identifier;
determining second ASR output data corresponding to the second audio data;
determining a third NLU hypothesis corresponding to the second ASR output data;
determining a fourth NLU hypothesis corresponding to the second ASR output data;
associating at least the second ASR output data, the third NLU hypothesis and the fourth NLU hypothesis with the first dialogue session identifier;
determining, using the first dialogue session identifier, that the second utterance is a repeat of the first utterance based at least in part on a comparison of the first NLU hypothesis and the third NLU hypothesis;
receiving sentiment data indicating a sentiment based on acoustic characteristics of the second audio data;
determining that the sentiment data indicates frustration;
determining, using the first dialogue session identifier, that the second NLU hypothesis corresponds to the fourth NLU hypothesis;
determining that the second confidence score satisfies a threshold value;
in response to (i) determining that the sentiment data indicates frustration, (ii) determining that the second utterance repeats the first utterance, and (iii) that the second confidence score satisfies the threshold value:

determining output text data including a representation of a second action corresponding to the second NLU hypothesis;
determining output audio data corresponding to the output text data using text-to-speech (TTS) processing; and
sending the output audio data to a device.

2. The computer-implemented method of claim 1, further comprising:
receiving third audio data representing a third utterance;
associating the third audio data with a second dialogue session identifier;
determining, using ASR processing, third ASR output data corresponding to the third audio data;
determining, using NLU processing, a fifth NLU hypothesis and a sixth NLU hypothesis corresponding to the third ASR output data, the fifth NLU hypothesis associated with a third confidence score and the sixth NLU hypothesis associated with a fourth confidence score;
performing a third action corresponding to the fifth NLU hypothesis;
receiving fourth audio data representing a fourth utterance;
associating the fourth audio data with the second dialogue session identifier;
determining, using ASR, fourth ASR output data corresponding to the fourth audio data;
determining, using the second dialogue session identifier, that the fourth utterance is a repeat of the third utterance;
receiving second sentiment data corresponding to the fourth audio data, the second sentiment data indicating a sentiment based on acoustic characteristics of the fourth audio data;
determining that the second sentiment data indicates frustration;
determining, using the second dialogue session identifier, that the sixth NLU hypothesis corresponds to the fourth ASR output data;
determining that the fourth confidence score does not satisfy the threshold value;
in response to determining that the second sentiment data indicates frustration, determining second output text data including a confirmation to perform the third action corresponding to the fourth NLU hypothesis;
determining second output audio data corresponding to the second output text data using TTS processing; and
sending the second output audio data to the device.

3. The computer-implemented method of claim 1, further comprising:
receiving third audio data representing a third utterance;
associating the third audio data with a second dialogue session identifier;
determining, using ASR processing, third ASR output data corresponding to the third audio data;
determining, using NLU processing, a fifth NLU hypothesis corresponding to the third ASR output data, a sixth NLU hypothesis associated with a third confidence score;
receiving signal-to-noise ratio (SNR) data corresponding to the third audio data;
determining that the SNR data exceeds a second threshold value indicating signal energy associated with the third utterance is low;
in response to determining that the SNR data exceeds the second threshold value, determining second output text data including a request to move closer to the device and repeat the third utterance;
determining second output audio data corresponding to the second output text data using TTS processing; and
sending the second output audio data to the device.

4. The computer-implemented method of claim 1, further comprising:
receiving third audio data representing a third utterance;
associating the third audio data with the first dialogue session identifier;
determining, using ASR processing, third ASR output data corresponding to the third audio data;
determining, using NLU processing, that the third ASR output data corresponds to negative feedback;
determining second output text data representing an apology;
determining second output audio data corresponding to the second output text data using TTS processing;
sending the second output audio data to the device;
determining to end a dialogue corresponding to the first dialogue session identifier; and
associating subsequently received fourth audio data with a second dialogue session identifier.

5. A computer-implemented method comprising:
receiving first audio data representing a first utterance;
determining, using natural language understanding (NLU) processing, first NLU data corresponding to the first audio data;
determining, using NLU processing, second NLU data corresponding to the first audio data, the second NLU data different than the first NLU data;
causing a first action to be performed in response to the first utterance, the first action corresponding to an intent included in the first NLU data;
receiving second audio data representing a second utterance;
determining a repeat indicator based on the second utterance being semantically similar to the first utterance;
receiving, from a sentiment detection component, sentiment data corresponding to the second audio data;
determining that the sentiment data indicates frustration; and
in response to the repeat indicator and the sentiment data indicating frustration, determining output data including a representation of a second action corresponding to the second NLU data, wherein the second action is different from the first action.

6. The computer-implemented method of claim 5, further comprising:
determining, using NLU processing, second NLU data corresponding to the first audio data, the second NLU data different than the first NLU data;
determining that the first NLU data satisfies a first condition;
determining that the second NLU data does not satisfy a second condition, and
wherein determining the output data comprises determining the output data representing a confirmation of the first action.

7. The computer-implemented method of claim 5, further comprising:
receiving third audio data representing a third utterance;
associating the third audio data with a dialogue session identifier;
performing a second action responsive to the third utterance;
receiving fourth audio data representing a fourth utterance;

associating the fourth audio data with the dialogue session identifier;
determining that the fourth utterance interrupts performance of the second action;
receiving second sentiment data corresponding to the fourth audio data, the second sentiment data indicating frustration; and
determining second output data other than performance of the second action.

8. The computer-implemented method of claim 5, further comprising:
determining, using automatic speech recognition (ASR) processing, an ASR confidence score corresponding to the first audio data;
determining a NLU confidence score associated with the first NLU data;
receiving alternative representation data corresponding to the first utterance; and
determining the output data other than performing the first action based at least in part on the sentiment data, the ASR confidence score, the NLU confidence score, and the alternative representation data.

9. The computer-implemented method of claim 5, further comprising:
receiving third audio data representing a third utterance;
associating the third audio data with a dialogue session identifier;
determining, using NLU processing, second NLU data corresponding to the third audio data;
determining second output data representing a confirmation to perform a second action corresponding to the second NLU data;
sending the second output data to a device;
receiving fourth audio data representing a fourth utterance;
associating the fourth audio data with the dialogue session identifier;
determining that the fourth utterance corresponds to negative feedback;
determining third output data representing an acknowledgement of the negative feedback;
sending the third output data to the device; and
determining to end a dialogue corresponding to the dialogue session identifier.

10. The computer-implemented method of claim 5, further comprising:
receiving third audio data representing a third utterance;
receiving signal quality data corresponding to the third audio data;
determining that the signal quality data corresponds to a potential error in ASR processing of the third audio data;
determining second output text data representing a system request;
determining second output audio data corresponding to the second output text data using speech synthesis processing; and
sending the second output audio data to a device.

11. The computer-implemented method of claim 5, further comprising:
determining, using NLU processing, second NLU data corresponding to the second audio data, the first NLU data including first intent data and the second NLU data including second intent data, and
wherein determining the repeat indicator comprises processing the first NLU data with respect to the second NLU data to determine that the second utterance is similar to the first utterance based at least in part on the first intent data corresponding to the second intent data.

12. A system comprising:
at least one processor; and
at least one memory including instructions that, when executed by the at least one processor, cause the system to:
receive first audio data representing a first utterance;
determine, using natural language understanding (NLU) processing, first NLU data corresponding to the first audio data;
determine, using NLU processing, second NLU data corresponding to the first audio data, the second NLU data different than the first NLU data;
cause a first action to be performed in response to the first utterance, the first action corresponding to an intent included in the first NLU data;
receive second audio data representing a second utterance;
determine a repeat indicator based on the second utterance being semantically similar to the first utterance;
receive, from a sentiment detection component, sentiment data corresponding to the second audio data;
determine that the sentiment data indicates frustration; and
in response to the repeat indicator and the sentiment data indicating frustration, determine output data including a representation of a second action corresponding to the second NLU data, wherein the second action is different from the first action.

13. The system of claim 12, wherein the instructions that, when executed by the at least one processor, further cause the system to:
determine, using NLU processing, second NLU data corresponding to the first audio data, the second NLU data different than the first NLU data;
determine that the first NLU data satisfies a first condition;
determine that the second NLU data does not satisfy a second condition, and
wherein the instructions that cause the system to determine the output data further causes the system to determine the output data representing a confirmation of the first action.

14. The system of claim 12, wherein the instructions that, when executed by the at least one processor, further cause the system to:
receive third audio data representing a third utterance;
associate the third audio data with a dialogue session identifier;
perform a second action responsive to the third utterance;
receive fourth audio data representing a fourth utterance;
associate the fourth audio data with the dialogue session identifier;
determine that the fourth utterance interrupts performance of the second action;
receive second sentiment data corresponding to the fourth audio data, the second sentiment data indicating frustration; and
determine second output data other than performance of the second action.

15. The system of claim 12, wherein the instructions that, when executed by the at least one processor, further cause the system to:
determine, using automatic speech recognition (ASR) processing, an ASR confidence score corresponding to the first audio data;

determine a NLU confidence score associated with the first NLU data;

receive alternative representation data corresponding to the first utterance; and determine the output data other than performing the first action based at least in part on the sentiment data, the ASR confidence score, the NLU confidence score, and the alternative representation data.

16. The system of claim 12, wherein the instructions that, when executed by the at least one processor, further cause the system to:

receive third audio data representing a third utterance;

associate the third audio data with a first dialogue session identifier;

determine, using NLU processing, second NLU data corresponding to the third audio data;

determine second output data representing a confirmation to perform a second action corresponding to the second NLU data;

send the second output data to a device;

receive fourth audio data representing a fourth utterance;

associate the fourth audio data with the dialogue session identifier;

determine that the fourth utterance corresponds to negative feedback;

determine third output data representing an acknowledgement of the negative feedback using natural language generation;

send the third output data to the device; and determine to end a dialogue corresponding to the dialogue session identifier.

17. The system of claim 12, wherein the instructions that, when executed by the at least one processor, further cause the system to:

receive third audio data representing a third utterance;

receive signal quality data corresponding to the third audio data;

determine that the signal quality data corresponds to a potential error in ASR processing of the third audio data;

determine second output text data representing a system request;

determine second output audio data corresponding to the second output text data using speech synthesis processing; and send the second output audio data to a device.

18. The system of claim 12, wherein the instructions that, when executed by the at least one processor, further cause the system to:

determine, using NLU processing, second NLU data corresponding to the second audio data, the first NLU data including first intent data and the second NLU data including second intent data, and wherein the instructions that cause the system to determine the repeat indicator causes the system to process the first NLU data with respect to the second NLU data to determine that the second utterance is similar to the first utterance based at least in part on the first intent data corresponding to the second intent data.

* * * * *